US011321704B2

(12) United States Patent
Friedlander et al.

(10) Patent No.: US 11,321,704 B2
(45) Date of Patent: *May 3, 2022

(54) SECURE MANAGEMENT OF TRANSACTIONS USING A SMART/VIRTUAL CARD

(71) Applicant: International Business Machines Corporation, Armonk, NY (US)

(72) Inventors: Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 484 days.

This patent is subject to a terminal disclaimer.

(21) Appl. No.: 16/564,760

(22) Filed: Sep. 9, 2019

(65) Prior Publication Data

US 2019/0392426 A1     Dec. 26, 2019

Related U.S. Application Data

(62) Division of application No. 14/279,857, filed on May 16, 2014, now Pat. No. 10,475,026.

(51) Int. Cl.
*G06Q 20/34*     (2012.01)
*G06Q 20/40*     (2012.01)
(Continued)

(52) U.S. Cl.
CPC ........... *G06Q 20/351* (2013.01); *G06F 9/455* (2013.01); *G06F 9/4555* (2013.01); *G06F 21/60* (2013.01);
(Continued)

(58) Field of Classification Search
CPC ... H04L 63/0428; H04W 12/37; G06Q 20/32; G06Q 20/34; G06F 21/60; G06F 21/62; G06F 9/4555; G06F 9/455
See application file for complete search history.

(56) References Cited

U.S. PATENT DOCUMENTS 6,000,016 A  12/1999  Curtis et al.
7,103,575 B1  9/2006  Linehan
(Continued)

FOREIGN PATENT DOCUMENTS

WO     WO-0193212 A2 * 12/2001 ............. G06Q 20/04
WO     2012111019 A1     8/2012
(Continued)

OTHER PUBLICATIONS

Gavin Philips, How Does CPU Cache Work_ What Are L1, L2, and L3 Cache, Feb. 17, 2021 (Year: 2021).*
(Continued)

*Primary Examiner* — John W Hayes
*Assistant Examiner* — Dennis G Keritsis
(74) *Attorney, Agent, or Firm* — Law Office of Jim Boice

(57) ABSTRACT

A method securely manages smart card transactions. A processing entity receives a smart card identifier from a smart card, where the smart card is a virtual card on a mobile computing device that comprises a processor, where the smart card identifier is a transaction-specific identifier for a transaction. A protected application is received at the mobile computing device, where a received protected application initially cannot be utilized by an operating system for execution by the processor. A security object is received at the mobile computing device, where the security object is used to convert the received protected application into an executable application that can be utilized by the operating system for execution by the processor. The processor
(Continued)

executes the executable application to act as the virtual card, where the virtual card provides a functionality of a pre-defined physical electronic card.

17 Claims, 11 Drawing Sheets

(51) Int. Cl.
| | |
|---|---|
| *G06Q 20/32* | (2012.01) |
| *H04L 9/40* | (2022.01) |
| *H04W 12/37* | (2021.01) |
| *G06F 9/455* | (2018.01) |
| *G06F 21/62* | (2013.01) |
| *G06F 21/60* | (2013.01) |
| *G06Q 20/42* | (2012.01) |
| *G06F 9/22* | (2006.01) |
| *G06F 9/30* | (2018.01) |
| *G06F 12/14* | (2006.01) |
| *H04L 29/06* | (2006.01) |

(52) U.S. Cl.
CPC .............. *G06F 21/62* (2013.01); *G06Q 20/32* (2013.01); *G06Q 20/3274* (2013.01); *G06Q 20/34* (2013.01); *G06Q 20/401* (2013.01); *G06Q 20/40145* (2013.01); *H04L 63/0428* (2013.01); *H04W 12/37* (2021.01); *G06F 9/22* (2013.01); *G06F 9/30003* (2013.01); *G06F 12/1408* (2013.01); *G06Q 20/42* (2013.01)

(56) References Cited

U.S. PATENT DOCUMENTS

| | | | |
|---|---|---|---|
| 7,275,686 B2 | 10/2007 | Estakhri | |
| 7,325,132 B2* | 1/2008 | Takayama | G06Q 20/3827 713/168 |
| 7,413,113 B1 | 8/2008 | Zhu | |
| 7,844,836 B1* | 11/2010 | Weaver | H04N 21/4623 726/30 |
| 7,920,851 B2 | 4/2011 | Moshir et al. | |
| 8,002,175 B2 | 8/2011 | Kuriyama et al. | |
| 8,485,440 B1 | 7/2013 | Arora et al. | |
| 8,577,803 B2 | 11/2013 | Chatterjee | |
| 8,600,883 B2 | 12/2013 | Wong | |
| 9,223,965 B2 | 12/2015 | Boivie | |
| 2001/0049704 A1 | 12/2001 | Hamburg | |
| 2003/0041026 A1 | 2/2003 | Heinonen | |
| 2003/0084346 A1 | 5/2003 | Kozuch et al. | |
| 2004/0039926 A1 | 2/2004 | Lambert | |
| 2004/0215876 A1 | 10/2004 | Roberti | |
| 2007/0047735 A1* | 3/2007 | Celli | H04L 9/0825 380/30 |
| 2008/0126260 A1 | 5/2008 | Cox | |
| 2010/0125509 A1 | 5/2010 | Kranzley et al. | |
| 2010/0279610 A1 | 11/2010 | Bjorhn et al. | |
| 2011/0191244 A1 | 8/2011 | Dai | |
| 2011/0314281 A1 | 12/2011 | Fielder | |
| 2012/0006891 A1 | 1/2012 | Zhou et al. | |
| 2012/0158581 A1 | 6/2012 | Cooley | |
| 2012/0191612 A1* | 7/2012 | Spodak | G06Q 20/3829 705/65 |
| 2013/0097034 A1* | 4/2013 | Royyuru | G06Q 20/3274 235/494 |
| 2013/0110658 A1* | 5/2013 | Lyman | G06Q 20/3674 705/41 |
| 2013/0178159 A1* | 7/2013 | Xie | G06Q 30/0601 455/41.1 |
| 2013/0185214 A1 | 7/2013 | Azen | |

FOREIGN PATENT DOCUMENTS

| | | | | |
|---|---|---|---|---|
| WO | | 2013177500 A1 | 11/2013 | |
| WO | WO-2013177500 A1 * | | 11/2013 | G06Q 20/20 |

OTHER PUBLICATIONS

Youtube Video What is Cache Memory L1, L2, and L3 Cache Memory Explained (Year: 2021).*

Tungall, What is an Attack Vector? 16 Common Attack Vectors in 2022, https://www.upguard.com/blog/attack-vector (Year: 2022).*

International Searching Authority, Written Opinion for PCT/CA2014/050685, dated Oct. 23, 2014.

Pirker, M. et al., "A Framework for Privacy-Preserving Mobile Payment on Security Enhanced ARM TrustZone Platforms", Proceedings of 2012 IEEE 11th International Conference on Trust, Security and Privacy in Computing and Communications, Jun. 2012, pp. 1155-1160. (Abstract Only).

Gao, J. et al., "A 2D Barcode-Based Mobile Payment System", Proceedings of the Third International Conference on Multimedia and Ubiquitous Engineering, Jun. 2009, pp. 320-329. (Abstract Only).

U.S. Appl. No. 14/101,916—Non-Final Office Action dated Jan. 28, 2015.

Arm Limited, "Arm Security Technology: Building a Secure System Using Trustzone Technology", Arm Limited, Apr. 2009, pp. 1-108.

U.S. Appl. No. 14/279,857—Non-Final Office Action dated Jun. 16, 2017.

U.S. Appl. No. 14/279,857—Final Office Action dated Feb. 16, 2018.

U.S. Appl. No. 14/279,857—Non-Final Office Action dated Mar. 26, 2019.

List of IBM Patents or Patent Applications Treated as Related, Sep. 9, 2019, 2 pages.

* cited by examiner

SECURE MANAGEMENT OF TRANSACTIONS USING A SMART/VIRTUAL CARD

BACKGROUND

The present disclosure relates to the field of smart cards, and specifically to smart cards that are dynamically configurable. Still more particularly, the present disclosure relates to the use of smart card to enable and/or authorize financial transactions and other transactional activities.

Cyber security is an increasing problem. As credit cards, identification cards, access cards, etc. provide more and more secure information, there is an increasing need to protect such information from nefarious parties.

SUMMARY

In one or more embodiments, a method securely manages smart card transactions. A processing entity receives a smart card identifier from a smart card, where the smart card is a virtual card on a mobile computing device that comprises a processor, where the smart card identifier is a transaction-specific identifier for a transaction. A protected application is received at the mobile computing device, where a received protected application initially cannot be utilized by an operating system for execution by the processor. A security object is received at the mobile computing device, where the security object is used to convert the received protected application into an executable application that can be utilized by the operating system for execution by the processor. The processor executes the executable application to act as the virtual card, where the virtual card provides a functionality of a predefined physical electronic card.

In one or more embodiments, the method(s) described herein are performed by an execution of a computer program product and/or a computer system.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
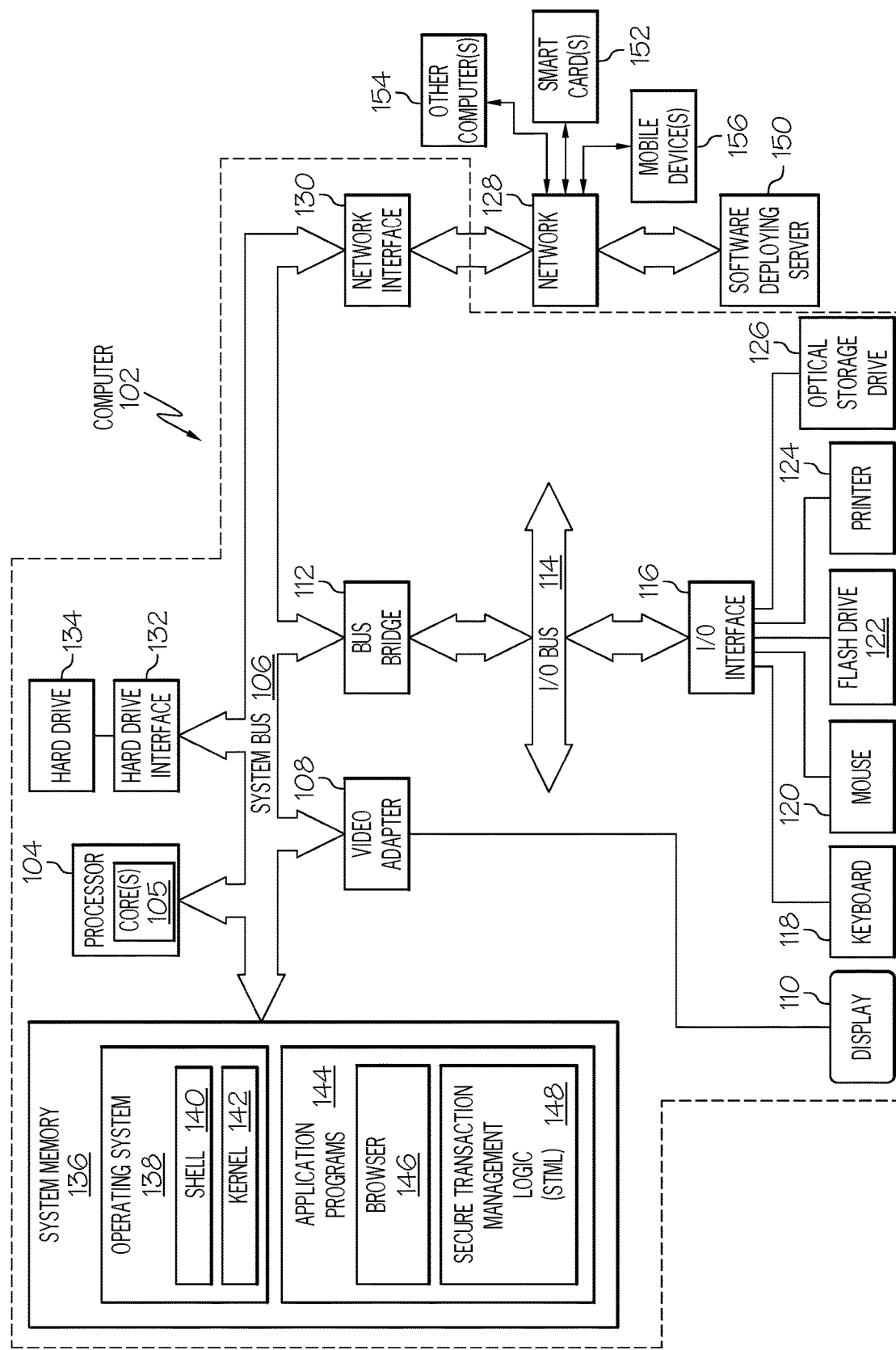
FIG. 1 depicts an exemplary computer which may be utilized by the present invention.

With reference now to the figures, and particularly to FIG. 1, there is depicted a block diagram of an exemplary computer 102, which the present invention may utilize. Note that some or all of the exemplary architecture shown for computer 102 may be utilized by software deploying server 150, other computer(s) 154, smart card(s) 152, and/or mobile device(s) 156.

Computer 102 includes a processor 104, which may utilize one or more processors each having one or more processor cores 105. Processor 104 is coupled to a system bus 106. A video adapter 108, which drives/supports a display 109, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Flash Drive 122, a printer 124, and an optical storage device 126 (e.g., a CD or DVD drive). The format of the ports connected to I/O interface 116 may be any known to those skilled in the art of computer architecture, including but not limited to Universal Serial Bus (USB) ports.

Computer 102 is able to communicate with a software deploying server 150, other computer(s) 154, smart card(s) 152, and/or mobile device(s) 156 via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Secure Transaction Management Logic (STML) 148. STML 148 includes code for implementing the processes described below in FIGS. 2-10. In one embodiment, computer 102 is able to download STML 148 from software deploying server 150, including in an on-demand basis. Note further that, in one embodiment of the present invention, software deploying server 150 performs all of the functions associated with the present invention (including execution of STML 148), thus freeing computer 102 from having to use its own internal computing resources to execute STML 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
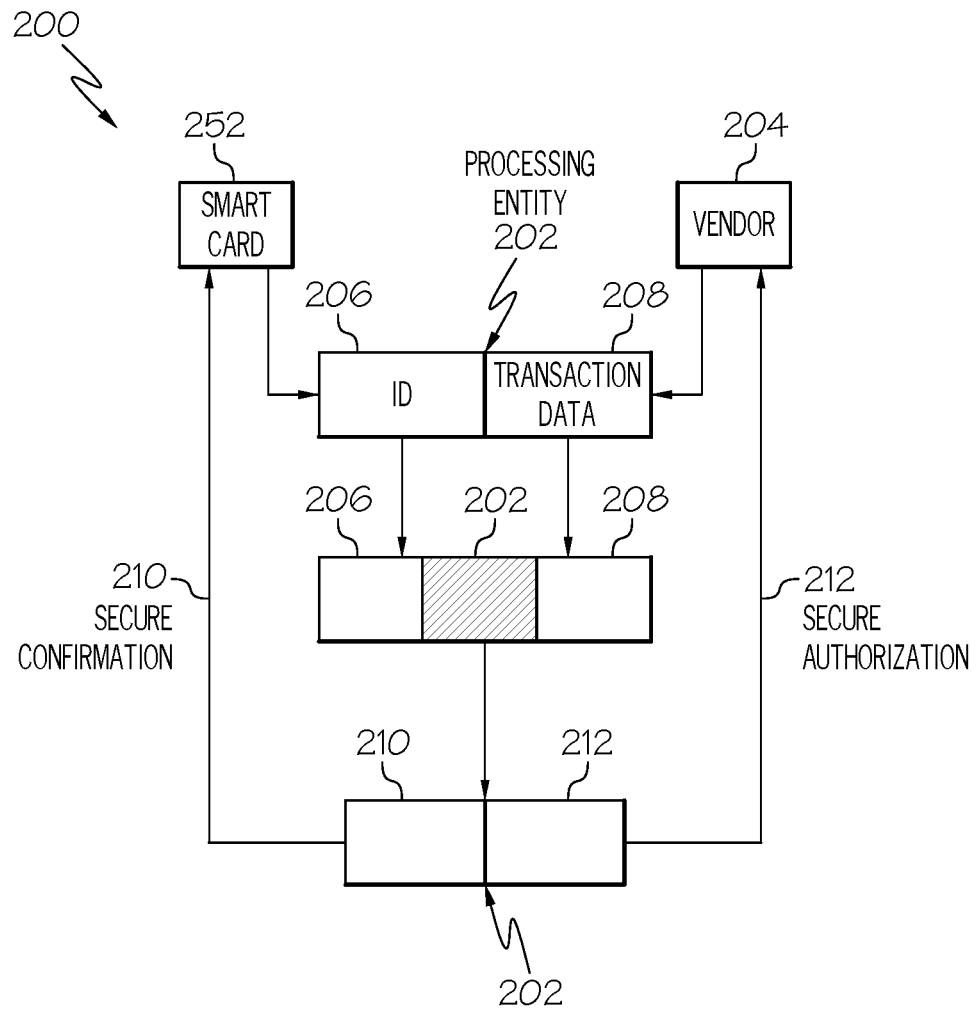
FIG. 2 illustrates an exemplary system in which an authenticating entity manages a transaction between two parties.

With reference now to FIG. 2, an exemplary system 200 in which a processing entity 202 manages a transaction between two parties is presented. The transaction between the two parties is defined as a specific set of interactions between at least two parties. Examples of such transactions include, but are not limited to, financial transactions (i.e., purchases), operational activities (e.g., operational/maintenance activities performed on a unit of equipment), access transactions (i.e., entering a building/room), identification transactions (i.e., where the transaction is a meeting between the first party and the second party, and where the first party to the transaction is presenting proof of identity to the second party), etc. For illustrative purposes, assume that the transaction described in FIG. 2 is a financial transaction.

As depicted, a smart card 252 is held/used by a first party to the financial transaction, such as a customer. Smart card 252 is defined as a card, either physical or virtual (i.e., configured on a mobile device such as a tablet computer, etc.), that is selectively configurable to provide data and/or functionality required for a particular type of activity/transaction. For example, smart card 252 may be configured to be a building access card, an identification card, a credit/debit card, etc. This selective configuration is achieved by implementing and/or executing an enabling program or set of data, as described below. By being selectively configured (e.g., through the use/execution of an object such as protected applications 414 shown in FIG. 4 or protected object 804 shown in FIG. 8), smart card 252 is able to perform the function of one or more traditional non-configurable cards. However, as just mentioned, for exemplary purposes an assumption will be made that the present transaction is a financial transaction (e.g., purchase), and thus the smart card 252 is a credit/debit card.

As shown in FIG. 2, a vendor 204 is a second party to the financial transaction with the holder of the smart card 252 (i.e., a first party to the transaction). The depicted vendor 204 may actually be a Point-Of-Sale (POS) terminal, used by a merchant, that includes the ability to read data from the smart card 252, such as through swiping the smart card 252, interrogating the smart card 252 via a near field communication system, etc. in order to access data contained within the smart card 252. That is, vendor 204 may be a computer system that utilizes some of all of the hardware depicted in FIG. 1 for computer 102, as may the processing entity 202.

Thus, the system 200 in FIG. 2 splits the transaction between the smart card 252 and the vendor 204 into two slices that make up a bifurcated transaction, in which each of the slices generates a smallest possible exposure surface. That is, activities of the smart card 252 are hidden from the vendor 204 and vice versa. All "card side" (i.e., from the perspective of the smart card 252) processing is stand-alone, since the smart card 252 has on-board processing abilities (see below) to reduce, if not eliminate, a physical attack. All merchant/vendor processing by vendor 204 is sheltered from the smart card 252 and the processing entity 202.

That is, as depicted in FIG. 2, the processing entity 202 receives a one-time encrypted identifier 206 from the smart card 252. This one-time encrypted identifier 206 is generated by the smart card 252, and in one embodiment contains no financial information about the user of the smart card 252, any credit card information, etc. Rather, it is merely an identifier of a specific transaction that is taking place between the holder of the smart card 252 and the vendor 204. Note that the processing entity 202 is able to decrypt the encrypted identifier 206, but the vendor 204 is not.

The transaction data 208 describes a transaction that is taking place between the smart card 252 and the vendor 204, and includes a description of the product being sold, the price, where the sale is occurring, etc., but includes no information about the customer, the smart card 252, any credit card information for the customer, etc. Rather, all such data is shielded from the smart card 252.

The processing entity 202 matches both sides of the transaction (i.e., the one-time encrypted identifier 206 and the transaction data 208) to complete the transaction (in one embodiment, with the aid of a credit card company or other entity). Once the transaction has been authenticated, a secure confirmation 210 of the transaction is sent to the smart card 252, while a secure authentication 212 for the transaction is sent to the vendor 204 by the processing entity 202. Thus, the identity and financial information of the customer is protected from the vendor, and transaction/financial information from the vendor (e.g., inventory information, discount information, etc.) is hidden from the customer.

Figure 3:
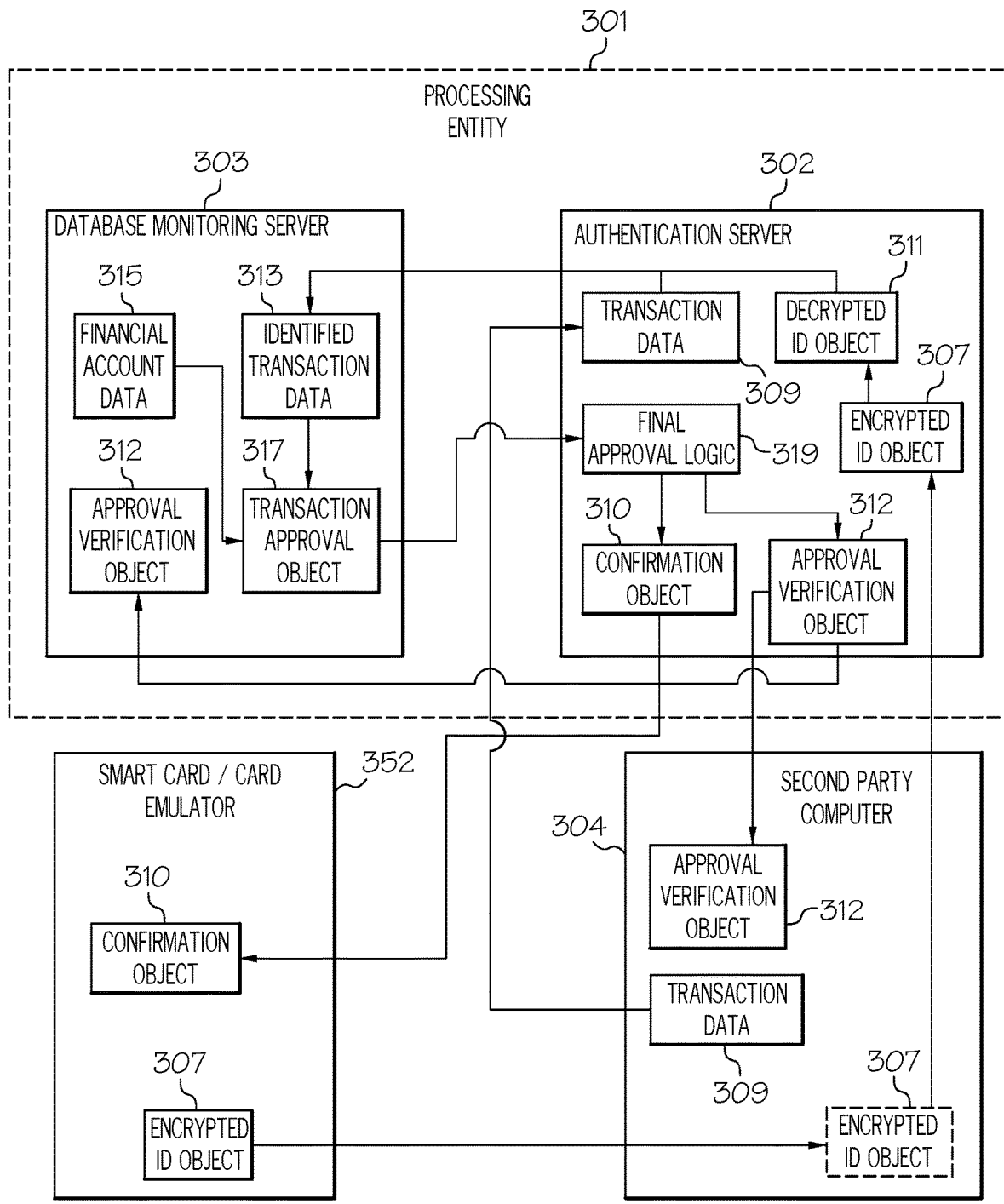
FIG. 3 depicts additional detail of the system shown in FIG. 2 according to one embodiment of the present invention.

With reference now to FIG. 3, additional detail of the system shown in FIG. 2 according to one embodiment of the present invention is presented. FIG. 3 depicts a smart card/card emulator 352 (analogous to the smart card 252 shown in FIG. 2), a second party computer 304 (used by vendor 204 in FIG. 2 or another type of party to a transaction/interaction to which the smart card/card emulator 352 is also a party/participant), and a processing entity 301. As shown, the processing entity includes/utilizes two sub-entities/resources: an authentication server 302 (used by the authenticating entity 202 shown in FIG. 2) plus a database monitoring server 303. In the case of a financial transaction, database monitoring server 303 would be used by a financial service, such as a credit card company, a bank, etc. In the case of a building access transaction (i.e., in which the smart card/card emulator 352 is being used to access a building/room), the database monitoring server 303 would be a database of rooms/buildings that the holder of the smart card/card emulator 352 is or is not authorized to enter. In the case of an identification transaction (i.e., in which the smart card/card emulator 352 is being used as an ID card), the database monitoring server 303 would be 1) a database of information about the holder of the smart card/card emulator 252, and/or 2) logic describing which parties are or are not authorized to learn such information about the holder of the smart card/card emulator 252. In the case of a maintenance and/or operations transaction (e.g., in which the smart card/card emulator 352 is being used to allow the holder of the smart card/card emulator 352 to perform a specific type of operation on equipment), the database monitoring server 303 would be 1) a database of information about what operations the holder of the smart card/card emulator 252 is authorized to perform, and/or 2) logic determining whether or not present circumstances (time, date, condition of the equipment, extraordinary (emergency) conditions, etc.) allows the holder of the smart card/card emulator 252 to perform the requested operation. That is, the database monitoring server 303 provides information and/or analysis to approve or disapprove a certain action taking place.

For illustrative purposes, assume that the transaction between the smart card/card emulator 252 and second party computer 304 is a financial transaction (e.g., in which a holder of the smart card/card emulator 252 is making a purchase from a merchant/vendor who is using the second party computer 304 as a vendor computer (e.g., a POS terminal). To initiate the purchase transaction, the smart card/card emulator 352 generates and transmits to the vendor computer an encrypted ID object 307. The encrypted ID object 307 (which in one embodiment actually is encrypted while in another embodiment is unencrypted) is a one-time identifier of the current transaction between the holder of the smart card/card emulator 352 and the merchant who is using the vendor computer (i.e., second party computer 304). That is, the encrypted ID object 307 contains no financial information about the holder of the smart card/card emulator 352, such as that holder's bank account, credit card information, etc. Likewise, the encrypted ID object 307 contains no detailed financial information about the purchase transaction, such as what is being purchased, the price, etc. Rather, the encrypted ID object 307 is merely a token object that identifies who made "Purchase A", with no financial details about the purchaser or the purchase itself.

In one embodiment, the encrypted ID object 307 passes through the second party computer 304 on its way to the authentication server 302. Since the encrypted ID object 307 is encrypted in a manner that the second party computer 304 cannot decrypt (e.g., unlike the authentication server 302, the second party computer 304 does not have the requisite private key needed to decrypt the encrypted ID object 307), then the encrypted ID object 307 is blocked/shielded from the second party computer 304. In this embodiment, the second party computer 304 is able to attach the encrypted ID object 307 to transaction data 309 before sending the transaction data 309 to the database monitoring server 303 (e.g., a credit card server). Again, note that in one embodiment only the authentication server 302 contains the resources needed to decrypt the encrypted ID object 307.

Thus, the encrypted ID object 307, when decrypted into a decrypted ID object 311, can later be used by the authentication server 302 and/or the database monitoring server 303 to approve/disapprove the specific transaction that is identified by the encrypted ID object 307.

In another embodiment, however, the encrypted ID object 307 (either encrypted or unencrypted) is sent directly from the smart card/card emulator 352 to the authentication server 302, and the transaction data 309 is matched to the decrypted ID object 311 (derived from encrypted ID object 307) via a lookup table, token from the vendor, etc.

Thus, whether actually encrypted or not, in one embodiment the encrypted ID object 307 contains a one-time identifier that includes 1) the static identifier of the customer and 2) the dynamic identifier of the one-time transaction. When combined together, the identifier of the customer and the identifier of the one-time transaction create a one-time identifier that is unique to that specific transaction for that specific customer.

Continuing with the example shown in FIG. 3, assume that the vendor (user of second party computer 304) has sent transaction data 309 about a purchase to the authentication server 302. The transaction data 309 includes detailed information about the purchase. If encrypted, the authentication server 302 has decrypted the encrypted ID object 307 to create a decrypted ID object 311, which, like the encrypted ID object 307, is only a one-time identifier of the purchase transaction without any financial details about the purchase or the holder of the smart card/card emulator 352.

The decrypted ID object 311 and the transaction data 309 are combined (by the authentication server 302 or, as depicted, by the database monitoring server 303) to generate an identified transaction data 313. That is, the decrypted ID object 311 identifies the transaction, and the transaction data 309 provides details about the transaction. Identified transaction data 313 therefore contains details not only about the financial transaction, but also the identity of the purchaser. Using this identity of the purchaser, the credit card company (using database monitoring server 303) is able to consult a database such as financial account data 315 to approve or disapprove the financial transaction. If the financial account data 315 supports the transaction (e.g., the credit card account has a sufficient amount of credit limit remaining), then the credit card company generates a transaction approval object 317.

The transaction approval object 317 is input into a final approval logic 319 (e.g., STML 148 shown in FIG. 1). The final approval logic 319 then determines whether or not the transaction follows certain stored rules for the customer and the vendor. That is, final approval logic 319 will confirm that the type of purchase is "normal" for the card holder (i.e., has occurred in the past or matches a profile of the card holder), is at a nominal time of day, is at an expected geographic location or genre of store, etc. If the final approval logic 319 determines that there is no anomaly with the transaction, then a confirmation object 312 (analogous to the confirmation object 212 in FIG. 2) is generated by the authentication server 302 and sent to the smart card/card emulator 352, and an approval verification object 312 (analogous to the secure authorization 212 shown in FIG. 2) is generated by the authentication server 302 and sent to the vendor (i.e., second party computer 304) as well as the credit card company (i.e., database monitoring server 303).

Thus, as described herein, the authentication server 302 1) brings together transactions and authorizations from a credit card company (e.g., from the database monitoring server 303) and from the merchant (e.g., the vendor computer depicted as second party computer 304); 2) matches and then approves or disapproves the transaction; and 3) issues (encrypted) responses to all three parties to the transaction (i.e., sends the smart card/card emulator 352 the confirmation object 310; and 4) sends the vendor computer (second party computer 304) and the credit card company (e.g., the database monitoring server 303) approval/confirmation of the transaction.

The merchant (using the second party computer 304) is given a single use approval key (approval verification object 312) necessary for payment from the credit card company (e.g., by "billing" the database monitoring server 303). Thus, the present invention trifurcates the transaction into 1) the customer/transaction ID generation, 2) the transaction data generation, and 3) the approval process, while maintaining a wall of secrecy between all three parts of the transaction.

In one embodiment of the present invention, the smart card 252 depicted in FIG. 2 (as well as the smart card/card emulator 352 shown in FIG. 3) is a virtual card (card emulator). Thus, with reference now to FIG. 4, an exemplary virtual card 402 as implemented within a mobile device 456 (e.g., one of the mobile device(s) 156 depicted in FIG. 1) is illustrated in accordance with one embodiment of the present invention. Mobile device 456 may be any mobile device containing a processor 404 (e.g., processor 104 depicted in FIG. 1) and a display 409 (e.g., display 109 shown in FIG. 1), such as a smart phone, a personal digital assistant, a tablet computer, etc. The virtual card 402 is defined as a software-based entity that has the functional equivalent of a physical card, such as a credit/debit card, identification card, building access card, a gift card, etc. Such physical cards typically have information related to the card and/or a holder of the card, such as account numbers associated with the card, a monetary value of the card, identity information about the holder of the card, etc., encoded on a magnetic strip or within a non-volatile electronic memory. When swiped across a reader, the card provides sufficient information to 1) access a server that contains account/identification/authorization information about the card and/or its user, and/or 2) directly provide such account/identification/authorization information about/for the card/user to the reader.

In one embodiment of the present invention, the virtual card 402 is implemented by an operating system 410 (within the mobile device 456) accessing and executing a requisite application that is part of the virtual card 402. However, without the present invention, this leaves this requisite application vulnerable to attack, since in the prior art the operating system and requisite application were both unprotected. That is, the requisite application (which is part of the virtual card) "trusted" the operating system 410, such that a hack into the operating system 410 would allow the hacked operating system 410 to access and maliciously abuse any applications under the control of the operating system 410. In order to reduce and/or eliminate this exposure, a security object 412 is utilized by the present invention. In one embodiment, security object 412 is compilable and/or executable software code that performs the processes described herein to access a protected application 414. In another embodiment, security object 412 is a credential, token, key, or other object that is used by an executable program to afford access to the protected application 414 described herein.

In one embodiment, security object 412 is used to decrypt a protected application 414. For example, consider protected application 414 within memory 416. Memory 416 may be system memory, L2/L3 cache memory, or even persistent memory (e.g., a flash drive, a hard drive, etc.) within the mobile device 456. While in its encrypted form (as originally received from an application download service 418), protected application 414 is unable to be implemented for execution via OS 410 by processor 404 in mobile device 456. That is, OS 410 is unable to address/call various operands from the protected application 414, and then send them to the processor 404 for execution.

Figure 4:
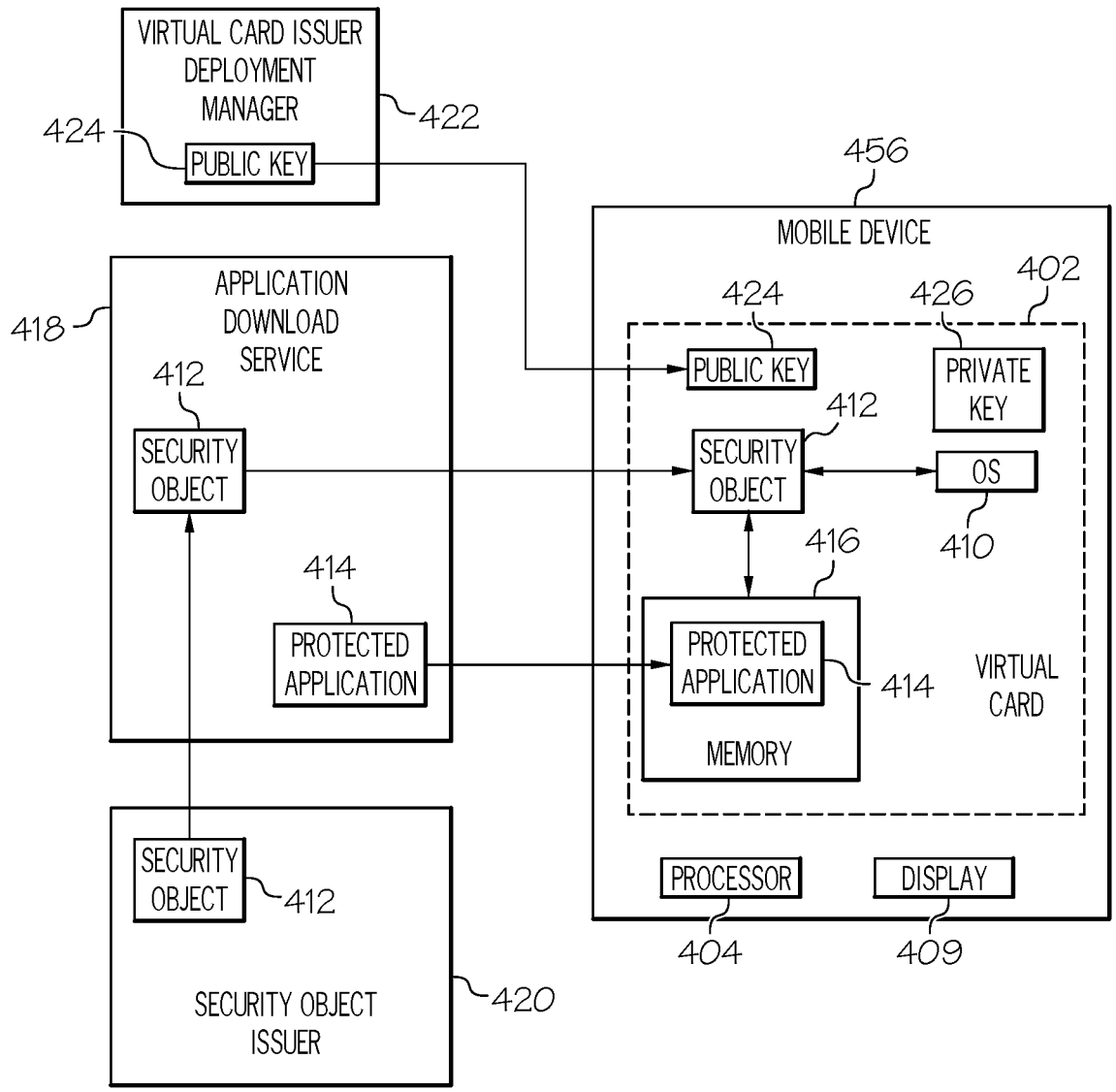
FIG. 4 illustrates a virtual card being implemented within a mobile device as used in accordance with one embodiment of the present invention.
Figure 5:
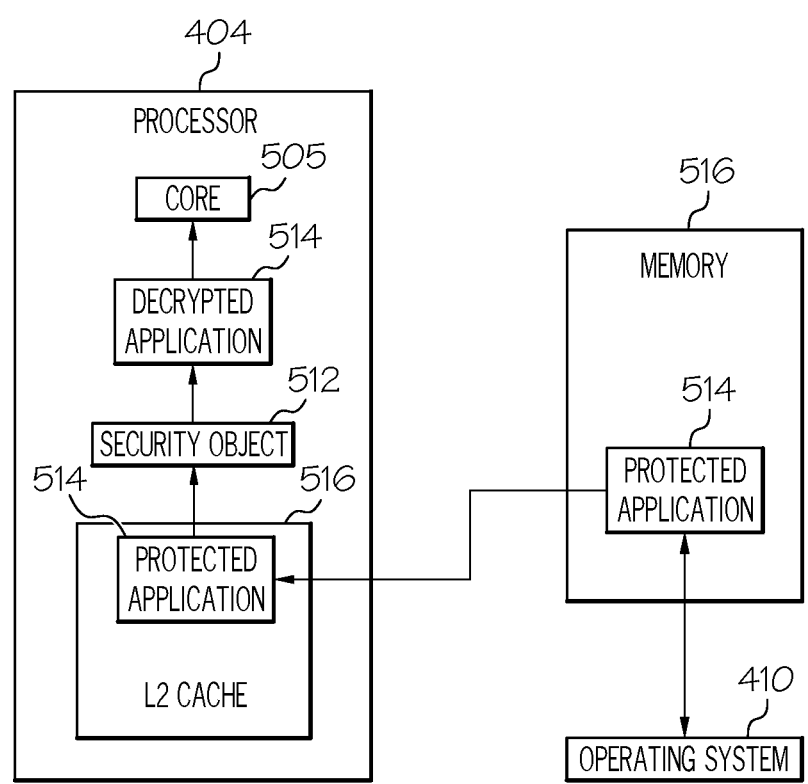
FIG. 5 depicts additional detail of a protected application within a virtual card being decrypted inside a processor in the mobile device.

However, FIG. 5 depicts additional detail of one embodiment in which the security object 412 is able to make the protected application 414 executable. More specifically, in one embodiment the security object 412 enables the processor to decrypt the protected application 414 inside a processor 404 in the mobile device, which creates and enables management of the virtual card 402 within the mobile device 456 (see FIG. 4). For example, assume that protected (e.g., "encrypted") application 414 is moved in its encrypted form from memory 416 within the mobile device to an operational memory within the processor 404, such as an L2 cache 516 (e.g., L2 cache 616 shown in FIG. 6 below). When read into the L2 cache 516, the protected application 414 is decrypted, and thus rendered executable within the core 505 (analogous to core(s) 105 in FIG. 1) of the processor 404. Details of an exemplary core 504 are presented in FIG. 6.

Figure 6:
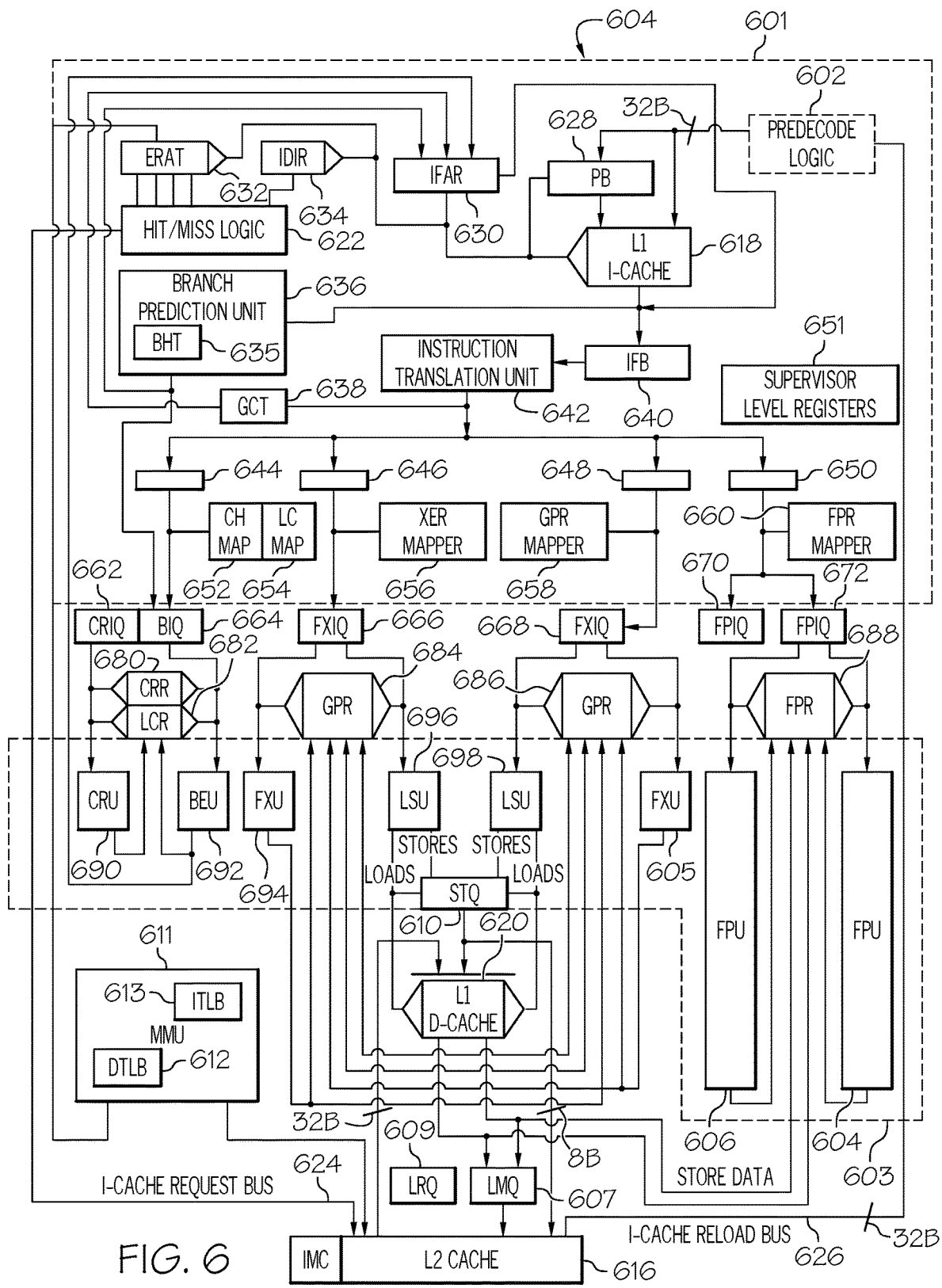
FIG. 6 illustrates additional detail of a core within the processor in the mobile device.

Referring now to FIG. 6, additional exemplary detail of core 105/505, as respectively depicted in FIG. 1 and FIG. 5, is presented as core 605. Core 605 includes an on-chip multi-level cache hierarchy including a unified level two (L2) cache 616 and bifurcated level one (L1) instruction (I) and data (D) caches 618 and 620, respectively. As is well-known to those skilled in the art, caches 616, 618 and 620 provide low latency access to cache lines corresponding to memory locations in system memories (e.g., system memory 136 shown in FIG. 1).

Instructions are fetched for processing from L1 I-cache 618 in response to the effective address (EA) residing in instruction fetch address register (IFAR) 630. During each cycle, a new instruction fetch address may be loaded into IFAR 630 from one of three sources: branch prediction unit (BPU) 636, which provides speculative target path and sequential addresses resulting from the prediction of conditional branch instructions, global completion table (GCT) 638, which provides flush and interrupt addresses, and branch execution unit (BEU) 692, which provides non-speculative addresses resulting from the resolution of predicted conditional branch instructions. Associated with BPU 636 is a branch history table (BHT) 635, in which are recorded the resolutions of conditional branch instructions to aid in the prediction of future branch instructions.

An effective address (EA), such as the instruction fetch address within IFAR 630, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 605, effective-to-real address translation is performed by memory management units (MMUs) and associated address translation facilities. Preferably, a separate MMU is provided for instruction accesses and data accesses. In FIG. 6, a single MMU 611 is illustrated, for purposes of clarity, showing connections only to Instruction Store Unit (ISU) 601. However, it is understood by those skilled in the art that MMU 611 also preferably includes connections (not shown) to load/store units (LSUs) 696 and 698 and other components necessary for managing memory accesses. MMU 611 includes Data Translation Lookaside Buffer (DTLB) 612 and Instruction Translation Lookaside Buffer (ITLB) 613. Each TLB contains recently referenced page table entries, which are accessed to translate EAs to RAs for data (DTLB 612) or instructions (ITLB 613). Recently referenced EA-to-RA translations from ITLB 613 are cached in EOP effective-to-real address table (ERAT) 632.

If hit/miss logic 622 determines, after translation of the EA contained in IFAR 630 by ERAT 632 and lookup of the real address (RA) in I-cache directory 634, that the cache line of instructions corresponding to the EA in IFAR 630 does not reside in L1 I-cache 618, then hit/miss logic 622 provides the RA to L2 cache 616 as a request address via I-cache request bus 624. Such request addresses may also be generated by prefetch logic within L2 cache 616 based upon recent access patterns. In response to a request address, L2 cache 616 outputs a cache line of instructions, which are loaded into prefetch buffer (PB) 628 and L1 I-cache 618 via I-cache reload bus 626, possibly after passing through optional predecode logic 602.

Once the cache line specified by the EA in IFAR 630 resides in L1 I-cache 618, L1 I-cache 618 outputs the cache line to both branch prediction unit (BPU) 636 and to instruction fetch buffer (IFB) 640. BPU 636 scans the cache line of instructions for branch instructions and predicts the outcome of conditional branch instructions, if any. Following a branch prediction, BPU 636 furnishes a speculative instruction fetch address to IFAR 630, as discussed above, and passes the prediction to branch instruction queue 664 so that the accuracy of the prediction can be determined when the conditional branch instruction is subsequently resolved by branch execution unit 692.

IFB 640 temporarily buffers the cache line of instructions received from L1 I-cache 618 until the cache line of instructions can be translated by instruction translation unit (ITU) 642. In the illustrated embodiment of core 605, ITU 662 translates instructions from user instruction set architecture (UISA) instructions into a possibly different number of internal ISA (IISA) instructions that are directly executable by the execution units of core 605. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 638 to an instruction group, the members of which are permitted to be dispatched and executed out-of-order with respect to one another. Global completion table 638 tracks each instruction group for which execution has yet to be completed by at least one associated EA, which is preferably the EA of the oldest instruction in the instruction group.

Following UISA-to-IISA instruction translation, instructions are dispatched to one of latches 644, 646, 648 and 650, possibly out-of-order, based upon instruction type. That is, branch instructions and other condition register (CR) modifying instructions are dispatched to latch 644, fixed-point and load-store instructions are dispatched to either of latches 646 and 648, and floating-point instructions are dispatched to latch 650. Each instruction requiring a rename register for temporarily storing execution results is then assigned one or more rename registers by the appropriate one of CR mapper 652, link and count (LC) register mapper 654, exception register (XER) mapper 656, general-purpose register (GPR) mapper 658, and floating-point register (FPR) mapper 660.

The dispatched instructions are then temporarily placed in an appropriate one of CR issue queue (CRIQ) 662, branch issue queue (BIQ) 664, fixed-point issue queues (FXIQs) 666 and 668, and floating-point issue queues (FPIQs) 670 and 672. From issue queues 662, 664, 666, 668, 670 and 672, instructions can be issued opportunistically to the execution units of processor 104 (shown in FIG. 1) for execution as long as data dependencies and antidependencies are observed. The instructions, however, are maintained in issue queues 662-672 until execution of the instructions is complete and the result data, if any, are written back, in case any of the instructions need to be reissued.

As illustrated, the execution units of core 605 include a CR unit (CRU) 690 for executing CR-modifying instructions, a branch execution unit (BEU) 692 for executing branch instructions, two fixed-point units (FXUs) 694 and 605 for executing fixed-point instructions, two load-store units (LSUs) 696 and 698 for executing load and store instructions, and two floating-point units (FPUs) 606 and 604 for executing floating-point instructions. Each of execution units 690-604 is preferably implemented as an execution pipeline having a number of pipeline stages.

During execution within one of execution units 690-604, an instruction receives operands, if any, from one or more architected and/or rename registers within a register file coupled to the execution unit. When executing CR-modifying or CR-dependent instructions, CRU 690 and BEU 692 access the CR register file 680, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 682 contains a count register (CTR), a link register (LR) and rename registers of each, by which BEU 692 may also resolve conditional branches to obtain a path address. General-purpose register files (GPRs) 684 and 686, which are synchronized, duplicate register files, and store fixed-point and integer values accessed and produced by FXUs 694 and 605 and LSUs 696 and 698. Note that floating-point register file (FPR) 688, which like GPRs 684 and 686 may also be implemented as duplicate sets of synchronized registers, contains floating-point values that result from the execution of floating-point instructions by FPUs 606 and 604 and floating-point load instructions by LSUs 696 and 698.

After an execution unit finishes execution of an instruction, the execution unit notifies GCT 638, which schedules completion of instructions in program order. To complete an instruction executed by one of CRU 690, FXUs 694 and 605 or FPUs 606 and 604, GCT 638 signals the execution unit, which writes back the result data, if any, from the assigned rename register(s) to one or more architected registers within the appropriate register file. The instruction is then removed from the issue queue and once all instructions within its instruction group have been completed, it is removed from GCT 638. Other types of instructions, however, are completed differently.

When BEU 692 resolves a conditional branch instruction and determines the path address of the execution path that should be taken, the path address is compared against the speculative path address predicted by BPU 636. If the path addresses match, no further processing is required. If, however, the calculated path address does not match the predicted path address, BEU 692 supplies the correct path address to IFAR 630. In either event, the branch instruction can then be removed from BIQ 664, and when all other instructions within the same instruction group have completed executing, from GCT 638.

Following execution of a load instruction, the effective address computed by executing the load instruction is translated to a real address by a data ERAT (not illustrated) and then provided to L1 D-cache 620 as a request address. At this point, the load instruction is removed from FXIQ 666 or 668 and placed in load reorder queue (LRQ) 609 until the indicated load is performed. If the request address misses in L1 D-cache 620, the request address is placed in load miss queue (LMQ) 607, from which the requested data is retrieved from L2 cache 616, and failing that, from another core (e.g., from core(s) 105 in FIG. 1) or from system memory (e.g., system memory 136 shown in FIG. 1). LRQ 609 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 610 into which effective addresses for stores are loaded following execution of the store instructions. From STQ 610, data can be stored into either or both of L1 D-cache 620 and L2 cache 616.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 604 of FIG. 6, the hard state includes the contents of user-level registers, such as CRR 680, LCR 682, GPRs 684 and 686, FPR 688, as well as supervisor level registers 651. The soft state of core 604 includes both "performance-critical" information, such as the contents of L1 I-cache 618, L1 D-cache 620, address translation information such as DTLB 412 and ITLB 613, and less critical information, such as BHT 635 and all or part of the content of L2 cache 616. Thus, the content of such registers are fixed values that describe a real-time current architecture state register of the processor core 604.

In one embodiment of the present invention, the decoded/decrypted operands from protected application are loaded (sequentially or otherwise) directly into the L1 I-cache 618 depicted in FIG. 6, thus bypassing the IFAR 630, PB 628, predecode logic 602, etc. That is, the security object 412 creates a decrypted application 514, as described in FIG. 5. In one embodiment, the decrypted application 514 is sent to the L2 cache 616, depicted in FIG. 6, from which it is dispatched to the predecode logic 602, IFAR 630, etc. However, in one embodiment, the security object 412 generates separate operands within the decrypted application 514 (i.e., the security object 412 acts as a compiler), and sends executable operands (i.e., object code) directly to the L1 I-cache 618 depicted in FIG. 6).

Returning now to FIG. 4, a security object issuer 420 is a server/service (e.g., using one or more of the other computer(s) 154 depicted in FIG. 1) that creates the security object 412. In one embodiment, each security object is specific for a particular application. That is, a first security object may be designed to enable decryption of a first protected application; a second security object may be designed to enable decryption of a second protected application; etc. This allows a fine level of granularity for controlling which protected applications can be decrypted/enabled, as described in further detail below. As depicted in FIG. 4, in one embodiment the security object issuer 420 sends the security object 412 that is specific for decrypting the protected application 414 to the application download service 418 (e.g., using one or more of the other computer(s) 154 depicted in FIG. 1), which then sends both the security object 412 as well as the protected application 414 to the mobile device 456, which securely generates the virtual card 402.

In order to manage and further protect the use of the security object 412, a virtual card issuer deployment manager 422 (e.g., using one or more of the other computer(s) 154 depicted in FIG. 1) uses and issues a public key 424. (Note that in one embodiment, security object issuer 420 and virtual card issuer deployment manager 422 are a same entity/service/server. However, in one embodiment, security object issuer 420 and virtual card issuer deployment manager 422 are different entities, thus allowing finer granularity in controlling the user of the protected application 414.) In one embodiment the security object 412 is protected by a public key 424. When a user of the mobile device wants to use the security object 412 (i.e., to generate and/or manage the virtual card 402), the mobile device uses a private key 426 (which together with public key 424 makes up a public/private key pair) to decrypt the security object 412. In one embodiment, the private key 426 is preloaded into the mobile device 456, while in another embodiment the private key 426 is input by a user (e.g., as a password). In either embodiment, without having the public key 424, the mobile device 456 is unable to decrypt the protected security object 412. Thus, the virtual card issuer deployment manager 422 is able to control the decryption of, and thus use of, the security object 412 by a particular mobile device 404 and/or user.

For example, first assume that mobile device 404 is prohibited from permanently storing a copy of public key 424 and/or security object 412, thus making the mobile device 404 dependent upon the virtual card issuer deployment manager 422 for its ability to create and/or manage a virtual card 402. This permanent storage prohibition may be accomplished by attaching a header to a packet that delivers the public key 424 or the security object 412, where the header contains an instruction that causes the key/security object to be automatically deleted from the mobile device 456 after a predetermined length of time. Thus, without the public key 424 and/or security object 412, the mobile device is unable to run a particular protected application 244. This enables the virtual card issuer deployment manager 422 to selectively enable various applications that depend on the key/security object in real time or near-real time. For example, assume that a first protected application is used to create a virtual building access card. Assume further that the first protected application requires a first security object and/or a first public key to execute that first protected application. Assume further that a second protected application is used to create a virtual identification card, and that the second protected application requires a second security object and/or a second public key to execute that second protected application. By "blanking" (i.e., erasing from memory) only the first security object and/or first public key, the mobile device can still generate the virtual identification card, but can no longer generate, use, update, or manage the virtual building access card. This allows the virtual card issuer deployment manager 422, application download service 418, and/or security object issuer 420 to selectively control which virtual cards are active/valid within the mobile device 456 at any time.

While the invention has been described using encryption to protect applications that are used to create virtual cards, applications in one embodiment can be protected according to where they are stored. For example, consider the system depicted in FIG. 7, in which a protected application, within a mobile device, is stored within a protected memory zone 702 of memory 716 within the mobile device. That is, within the mobile device (e.g., mobile device 456 shown in FIG. 4) is a memory 716, such as system memory, flash memory, etc. Memory 716 has a protected memory zone 702, which can only be accessed by the operating system 410 with proper security credentials/objects, such as security object 712. Security object 712 is similar to the security object 412 shown in FIG. 4, in that it may be issued by a security object issuer 420, transmitted to the mobile device 456 by an application download service 418, protected by a public key 424 from a virtual card issuer deployment manager 422, etc. However, in the process depicted in FIG. 7, the application used to create that virtual card (e.g., virtual card 402 shown in FIG. 4) may or may not be encrypted. If the application needed to create the virtual card is not encrypted (e.g., protected unencrypted application 714 shown in FIG. 7), protected unencrypted application 714 is still protected based on the fact that it is stored in the protected memory zone 702 of memory 716. That is, without the security object 712, the operating system 410 cannot access the protected memory zone 702, and thus cannot access the protected unencrypted application 714, thereby preventing the creation and/or use and/or maintenance of the virtual card.

In one embodiment, the security object 712 contains a security algorithm/key/password, which is required by a memory manager (not shown) to allow the operating system 410 to access the protected memory zone 702. If the mobile device has a copy of the security object 712 (i.e., it has been sent from the application download service 418 and/or unwrapped/decrypted using the public/private key pair (424/426) depicted in FIG. 4), then the protected unencrypted application 714 is loaded into L2 cache 516 (or other operational memory) for use by core 505 within processor 404. Note that the protected unencrypted application 714 is still protected from malicious attack via the (unprotected) operating system 410, since it 1) cannot be accessed outside of the processor 404 and/or memory 716, and 2) can only be accessed through the use of the security object 712.

Figure 7:
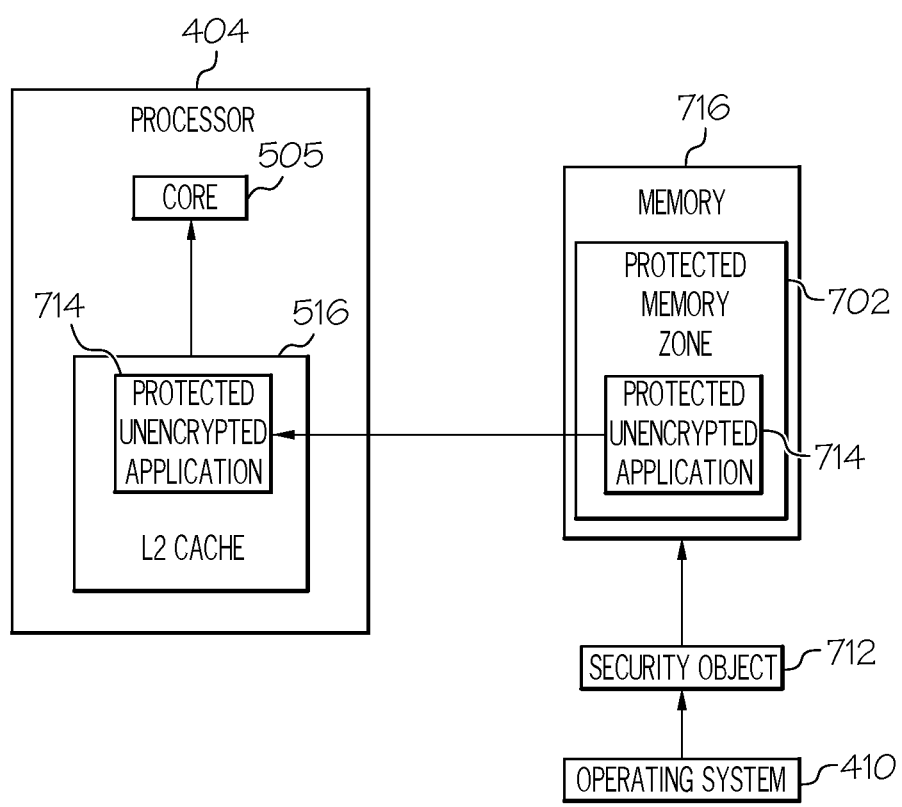
FIG. 7 depicts additional detail of a protected application, within a mobile device, being stored within a protected memory zone within the mobile device.

Note that while the protected application 714 in FIG. 7 is described as being "unencrypted", in one embodiment it actually is encrypted (e.g., using the process(es) described above). That is, even though protected unencrypted application 714 is secure due to where it is stored (i.e., within protected memory zone 702), in one embodiment additional protection is provided by encrypting the protected application 714 before it is stored within the protected memory zone 702.

Returning to FIG. 4, note that for purposes of clarity the memory 416 shown in FIG. 4 depicts only the protected application 414 as being contained within memory 416, is it understood that memory 416 (e.g., system memory) will also contain OS 410, security object 412, public key 424, and/or private key 246, as may be required for implementing the invention disclosed herein.

Note again that in FIG. 4 and/or FIG. 7, in one embodiment the protected application 414 and/or the protected unencrypted application 714 are unusable until they are inside of the processor 404, where they are converted into their usable form using the security object 412/712. This ensures that the creation/execution of the virtual card 402 cannot be performed without the use of the security object 412/712, which use must occur inside of (within) the processor 404.

While the present invention has been described above using a virtual smart card, in one embodiment the present invention utilizes a physical smart card. Thus, with reference now to FIG. 8, an exemplary smart card 852, which may be one of the smart card(s) 152 depicted in FIG. 1, is depicted. By being selectively configured (e.g., through the use/execution of an object such as unprotected object 828), smart card 852 is able to perform the function of one or more traditional cards. For example, in various embodiments smart card 852 has the functionality of a credit/debit card, identification card, building access card, a gift card, etc., either at the same time or at different times. Such physical cards typically have information related to the card and/or a holder of the card, such as account numbers associated with the card, a monetary value of the card, identity information about the holder of the card, etc., encoded on a magnetic strip or within a non-volatile electronic memory. When swiped across a slotted reader or other card reading device, the card thus provides sufficient information to 1) access a server that contains account/identification/authorization information about the card and/or its user, and/or 2) directly provide such account/identification/authorization information about/for the card/user to the reader.

Figure 8:
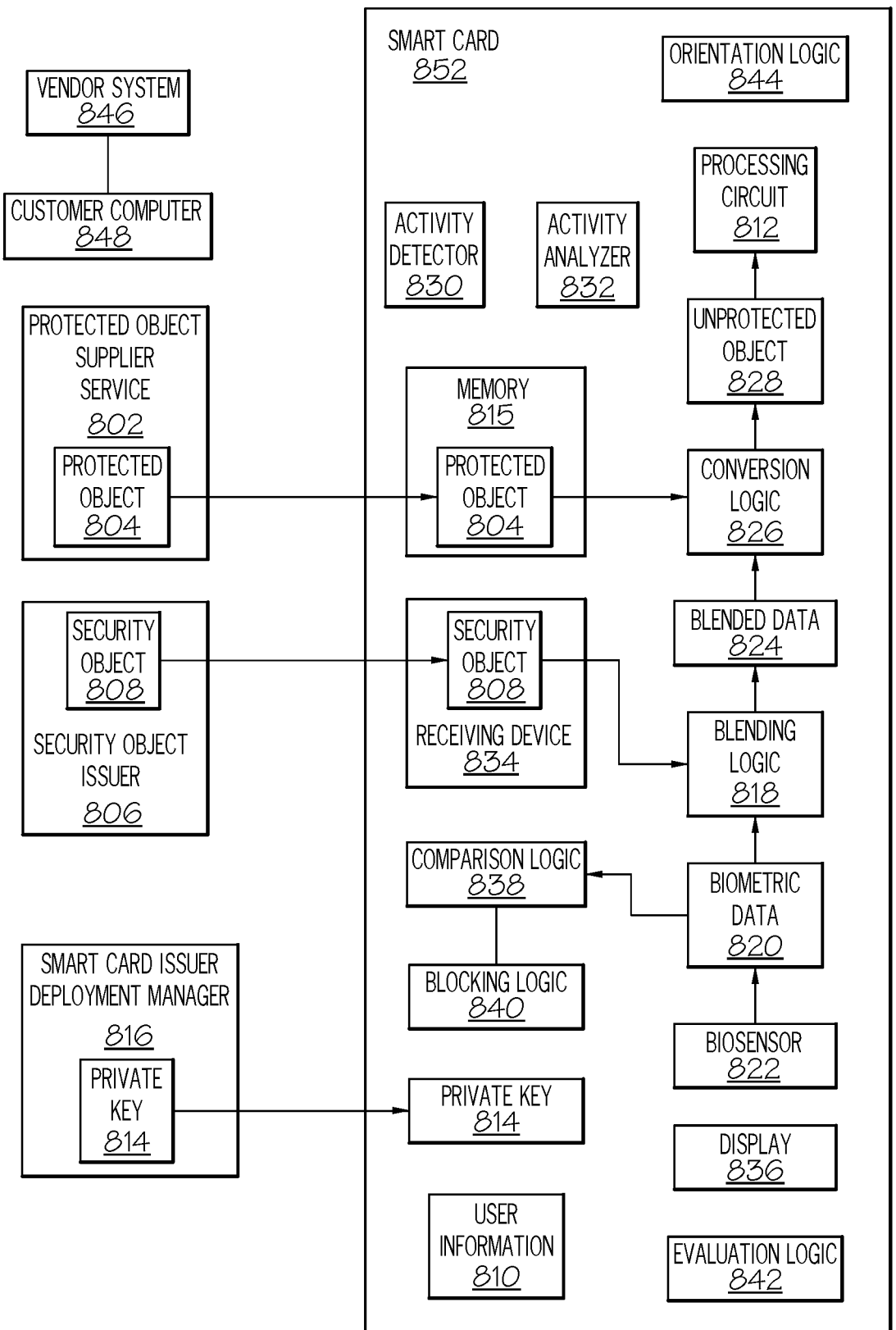
FIG. 8 illustrates a novel smart card as used according to one or more embodiments of the present invention.

As shown in FIG. 8, a protected object supplier service 802, which may utilize computer 102 and/or one or more of the other computers 154 depicted in FIG. 1, is coupled to smart card 852 (e.g., via a network such as network 128 shown in FIG. 1). The protected object supplier service 802 creates, contains, and/or supplies a protected object 804.

Protected object 804 is an object that is needed by smart card 852 to provide a particular predefined functionality to smart card 852. For example, if smart card 852 contains sufficient processing power to support an operating system, a compiler, etc., then protected object 804 may be a software application that allows the smart card 852 to process transaction data, provide a user with access to a building by activating a "smart" physical door lock, etc. If smart card 852 contains a more rudimentary level of processing power that can still execute precompiled machine code (e.g., microcode), then protected object 804 is such microcode. Execution of such microcode also allows the smart card 852 to process transactions, open a smart physical door lock, etc., depending on what the microcode (protected object 804) is.

In one embodiment, protected object 804 is not executable code, but rather is a simple input signal. For example, protected object 804 may be signals that are sent, via hardwires, to one or more pins in an Integrated Circuit (IC) package (e.g., processing circuit 812), thus enabling/disabling certain functions of the IC within that IC package. Again, the functions of such an IC may be to process transactions, open a physical door lock, etc., depending on the protected object 804 (and thus the unprotected object 828), as well as the configuration of the entity to which the smart card 852 is coupled/read (e.g., a point-of-sale terminal, a building access pad, etc.).

In one or more embodiments of the present invention, note that the protected object 804 is "protected". The term "protected" is defined as being unusable by smart card 852 in its present state. For example, the protected object 804 may be encrypted by hashing or otherwise rearranging the digital data that represents machine-executable code. In an embodiment in which the protected object 804 is merely one or more voltage levels being supplied to IC package pin(s), then the protected object 804 may have these voltage levels moved higher/lower, such that the voltage levels no longer represent their original information/instructions to the IC package pin(s).

Also coupled to the smart card 852, via a network such as network 128 shown in FIG. 1, is a security object issuer 806, which may utilize the computer 102 and/or one or more of the other computer(s) 154 depicted in FIG. 1. Within security object issuer 806 is a security object 808. Security object 808 is code/microcode/signals that are required to convert the protected object 804 into a form that can be utilized by the smart card 852. As described herein in one or more embodiments of the present invention, however, the security object 808 alone is not enough to convert the protected object into a usable form. Rather, biometric data 820 (i.e., one or more biomarkers that are unique to a particular person, such as that person's thumbprint, photo, etc.) will also be needed to convert the protected object 804 into an unprotected object 828, as discussed herein. In one embodiment, security object 808 is compilable and/or executable software code that performs processes described herein to enable the use of a protected object 804. In another embodiment, security object 808 is a credential, token, key, or other object that is used to afford access to a protected area of memory in which the protected object 804 is stored, as also described herein.

In one embodiment, each security object 808, which is created by security object issuer 286, is specific for a particular application (e.g., protected object 804). That is, a first security object may be designed to enable decryption of a first protected object (if that protected object is an application); a second security object may be designed to enable decryption of a second protected object (again assuming that this second protected object is an application); a third security object may be designed to enable changing the voltage levels of inputs to IC pins (if the protected object is a set of IC pin voltage inputs); etc. This allows a fine level of granularity for controlling which protected objects (i.e., protected object 804) can be decrypted/enabled, as described in further detail below.

Continuing with FIG. 8, assume that smart card 852 must be able to utilize an unprotected version of protected object 804, in order to provide a specific function. For example, assume that smart card 852 is a financial transaction card (e.g., a credit card, a debit card, etc.), and that smart card 852 is designed to allow a holder to swipe the card through a card reader, in order to read information about the card holder (i.e., his/her bank account number, store account number, amount of credit left on a prepaid smart card, etc.), thus allowing a purchase transaction to be completed. In a simple example, this information would be read from the user information 810, which may be stored on a magnetic strip, a near-field-communication (NFC) identification chip (e.g., an Radio Frequency Identifier—RFID), etc. However, this embodiment would be easy to hack, such as by a false reader (e.g., a "Trojan horse" reader that looks like an ATM machine, but is actually just an illicit information reader). Similarly, the user information could be the card's account number that is simply printed on the front of the card (along with a security pin number). Again, this is easy to hack by simply looking over the user's shoulder (either in person or with the use of surreptitious overhead cameras). The present invention overcomes this security exposure.

Referring still to FIG. 8, assume that a processing circuit 812 is used to provide the smart card 852 with one or more functions (e.g., those of a credit card, debit card, identification card, building access card, operation authorization card, etc.). For example and in one embodiment of the present invention, the output of the processing circuit 812 will enable user information 810 to be released to an NFC transmitter (assuming that user information 810 is otherwise inaccessible to any entity outside of the smart card 852) or other input/output (I/O) devices (not depicted). This release of the user information 810 can then be used by a card reader to allow the card holder to complete a purchase, enter a building/room, perform a restricted operation (e.g., perform a regulated/restricted operation on equipment), etc. That is, in one embodiment of the present invention the output from the processing circuit 812 is not the user information 810 itself, but rather is a requisite signal needed to access the user information 810. For example, user information 810 may be stored in a protected area (not expressly shown) of memory 815. In order to access this protected area of memory, a "key" (e.g., a set of bits in a predetermined order) must be provided to a memory controller (not depicted) before the user information 810 can be accessed.

In one embodiment of the present invention, just the security object 808 is needed to convert the protected object 804 into a usable condition/format. For example, if protected object 804 is protected by being encrypted, then security object 808 may simply be a decryption key (e.g., a private key such as private key 814) needed to decrypt the encrypted protected object 804. As depicted in FIG. 8, in one embodiment a smart card issuer deployment manager 816 creates, stores, and deploys the private key 814. This allows the smart card issuer deployment manager 816 to control the use of the protected object 804 at a high level of granularity. For example, assume that the private key 814 is specific for use in decrypting security object 808 and/or protected object 804. Thus, private key 814 is only able to enable functionality of smart card 852 that is associated with protected object 804. However, assume now the protected object 804 is needed to make the smart card function as a credit card for a first account, and that another protected object (not depicted but analogous in function to the depicted protected object 804) and/or security object (also not depicted but analogous in function to the depicted security object 808) are used to enable the smart card 852 with another functionality (e.g., to work as a credit card for a second account, to provide access to a building, etc.) than the functionality afforded by the depicted protected object 804. Thus, different private keys are able to control different protected objects, and therefore real-time functionalities of the smart card 852.

In order to allow control of the functionality of the smart card 852 to be variable in real time, in one embodiment smart card 852 is prohibited from permanently storing a copy of private key 814, thus making the smart card 852 dependent upon the smart card issuer deployment manager 816 for its ability to provide various functionalities. This permanent storage prohibition may be accomplished by attaching a header to a packet that delivers the private key 814 from the smart card issuer deployment manager 816, where the header contains an instruction that causes the private key 814 to be automatically deleted from the smart card 852 after a predetermined length of time. Thus, without the private key 814 and/or security object 808, the processing circuit 812 is unable to enable a certain functionality to smart card 852. This enables the smart card issuer deployment manager 816 to selectively enable various protected objects that depend on the private key/security object in real time or near-real time. For example, assume that a first protected object is used to enable the smart card 852 to function as a building access card. Assume further that the first protected object requires a first security object and/or a first public key to execute that first protected object. Assume further that a second protected object is used to enable the smart card 852 to function as an identification card, and that the second protected object requires a second security object and/or a second private key to utilize that second protected object. By "blanking" (i.e., erasing from memory) only the first security object and/or first private key, the smart card can still function as an identification card, but can no longer function as a building access card. This allows the smart card issuer deployment manager 816 to selectively control which functions of the smart card 852 are active/valid at any time.

While simple use of the private key 814 to decrypt the security object 808 in order to convert the protected object 804 into a usable state is fast, it is not particularly secure, since unauthorized access can obtain the private key 814, thus making the entire system unsecure. However, one embodiment of the present invention provides a system that is far more secure and unbreakable in protecting the assets (e.g., user information 810) and functionality (e.g., building access) of the smart card 852. This system utilizes a blending logic 818, which in a preferred embodiment is a Field Programmable Gate Array (FPGA), although in an alternate embodiment may be any other type of hardware circuit or executable software with a processor unit.

As depicted in FIG. 8, blending logic 818 receives both the security object 808 (which was received from the security object issuer 806 by hardware such as a receiving device 834) as well as a biometric data 820 from a biosensor 822, to create blended data 824, which is processed by conversion logic 826 to convert the protected object 804 into an unprotected object 828, which is now in a format/state that is usable by the processing circuit 812. For example, consider the following scenario/use case.

Assume that a user is attempting to use smart card 852 as a credit card to make a purchase in a store. This use poses two risks: 1) theft of information from the credit card, and 2) unauthorized use of the credit card by an unauthorized holder. The use of blending logic 818 reduces, if not eliminates, both of these risks.

Blending logic 818 utilizes an algorithm known only to blending logic 818 and/or conversion logic 826. This algorithm combines, in a secure manner (i.e., according to the private algorithm known to blending logic 818), the security object 808 with a biometric data 820. Examples of a biometric data 820 include, but are not limited to, a fingerprint, an eye scan, a photograph, or any other measurement of a physiological feature of a person who is in possession of the smart card 852. For example, biosensor 822 may be a simple camera, which can capture the facial features of the card holder. Similarly, biosensor 822 may be a touch sensitive screen that is able to detect the ridges of the card holder's fingerprint/thumbprint. By taking a photo of the user, or measuring his/her fingerprint, retinal pattern, etc., digital biometric data 820 for a particular person is thus generated. The security object 808 is then combined with the biometric data 820 to create a blended data 824, which is unique for 1) the security object and 2) the holder of the smart card 852.

Blended data 826 now functions as a "ultra-private" key that is used by conversion logic 826 to convert protected object 804 into the unprotected object 828. The unprotected object 828 may be a software program, a set of microcode/machine code, a voltage converter, a timing delay, or any other software or hardware object that enables processing circuit 812 to operate in a manner that enables smart card 852 to perform a particular function.

For example, assume that processing circuit 812 has the ability to execute software code. Unprotected object 828 may be software that, when executed by processing circuit 812 (e.g., a microprocessor), selectively allows smart card 852 to function as a credit card, a debit card, a building access card, an operation authorization card, or some other type of card. That is, in one embodiment the execution of this software code gives the smart card 852 one particular functionality. In order to have another functionality, then another unprotected object must be executed. Thus, one unprotected object 828 may give the smart card 852 the ability to act as a credit card, while another unprotected object 828 may give the smart card 852 the ability to act as a building access card.

In another embodiment, however, the processing circuit 812 is more rudimentary than a code executing system. For example, processing circuit 812 may be an audio annunciator (sound generator, including a speaker) that emits a particular sound for a specific purpose. For example, assume that smart card 852 is a building access key card that operates with a sound-activated access panel. In order to enter the building, the sound-activated access panel must receive a certain frequency of sound (subsonic, sonic, and/or ultrasonic), perhaps at a certain decibel level, in order to unlock a door to a building/room. The only way this audio annunciator is able to produce this specific sound is through the use of the unprotected object 828, which may be a control signal to the audio annunciator (i.e., processing circuit 812).

Note that in one embodiment, the unprotected object 828 is created with the use of 1) the protected object 804, 2) the security object 808, and 3) the biometric data 820, which includes the use of the blending logic 818, as described above. In an alternative embodiment, however, the blending logic 818 is skipped, such that the biometric data 820 alone is used by the conversion logic 826 to convert the protected object 804 into the unprotected object 828.

Note further that while the process described above uses the blending logic 818 to provide an additional layer of protections to the security object 808, in an alternative embodiment the blending logic 818 receives the protected object 804 while the conversion logic 826 receives the security object 808. This allows the protected object 804 to become the blended data 824 with the biometric data 820, thus giving more protection to the protected object 804, rather than the security object 808.

In one embodiment, the protected object 804 can be directly converted by the conversion logic 826 into the unprotected object 828 by using the security object 808 directly, instead of the blended data 824 as described above. The decision to utilize the biosensor 822 and blending logic 818 may be prompted by real-time circumstances, which are identified by an activity detector 830 and an activity analyzer 832. The activity detector 830 is hardware that receives a signal that describes present circumstances, including what activities are being attempted by the holder of the smart card 852, and the activity analyzer 832 is software/firmware or specially designed hardware that analyzes the signal received by the activity detector 830 to determine whether or not the biometric data 820, security object 808, and/or private key 814 are needed to convert the protected object 804 into the unprotected object 828.

For example, assume that activity detector 830 detects that the smart card 852 has been swiped through a Point Of Sale (POS) card reader, indicating that the holder of the smart card 852 is attempting to make a purchase. However, the activity detector 830 detects an anomaly regarding the attempted transaction. For example, the POS card reader may be in a city/country that is far from where the holder of the smart card 852 resides, as determined by the activity analyzer 832. Or the activity detector 830 may detect that the purchase is for an expensive piece of jewelry, which the activity analyzer 832 determines is a type of purchase that has never been made by the holder of the smart card 852. Or the activity detector 830 may detect, from an on-board time clock or a reading from a card swiping machine, that the smart card 852 is being used at 3:00 AM, which the activity analyzer 832 determines is a time of day that the smart card 852 has never been used before. Detecting and analyzing of any type of anomaly, including those just mentioned, will prompt the smart card 852 (e.g., the activity analyzer) to initiate additional security measures. For example, detection of the transaction anomaly may cause a message to be displayed on a display 836 of the smart card, directing the user to take his picture, swipe his fingerprint, etc. with the biosensor 822 on the smart card 852. If the biometric data 820 ultimately causes the unprotected object 828 to be generated by the conversion logic 826 (i.e., the biomarkers match those of the authorized card holder), then the purchase is allowed to proceed by the processing circuit 812 becoming active (i.e., providing the functionality of a credit card). However, if an unauthorized user is holding the smart card 852, then the biometric data 820 will be faulty, and the requisite unprotected object 828 will not be generated, thus preventing the smart card 852 from functioning as a credit card.

In another example, assume that activity detector 830 is a Global Positioning System (GPS) detector. In this example, the GPS system (or a similar location detecting system, such as a signal triangulating system within a building/room that provides exact real-time location information) will receive real-time signals indicating the current location of the smart card 852. Assume that the holder of the smart card 852 wants to use the smart card 852 as an authorization card to override a safety system (e.g., a power lockout to a machine). Thus, processing circuit 812 may provide information (e.g., from the user information 810) needed to perform such an operation. If the person is next to the machine whose power lockout is to be overridden, then the person will know that the power will be coming back on to the machine, since he/she is the one giving the order. Thus, there are no surprises to that person when the power to the machine comes back on. However, if the person holding the smart card 852 and attempting to power up the machine is at a control panel that is in another building (e.g., several hundred feet or miles from the machine being powered back up), then overriding the power lockout could be hazardous to an unsuspecting person who is working on or next to that machine. Therefore, the activity detector 830 identifies the location of the person who is in possession of the smart card 852 as being unsafe. If the person had been standing next to the machine, then the unprotected object 828 would have allowed the smart card 852 to be used to override the power lockout to the machine. That is, the activity analyzer 832 evaluates 1) the current location of the smart card 852 and 2) the functionality being provided by the unprotected object 828 when input to the processing circuit 812. But by determining that the smart card 852 is not near the machine being powered back up, the activity analyzer 832 will prevent the processing circuit 812 from executing, either by disabling the processing circuit 812, or by disabling the conversion logic 826 and/or the blending logic 818 and/or the biosensor 822.

Figure 9:
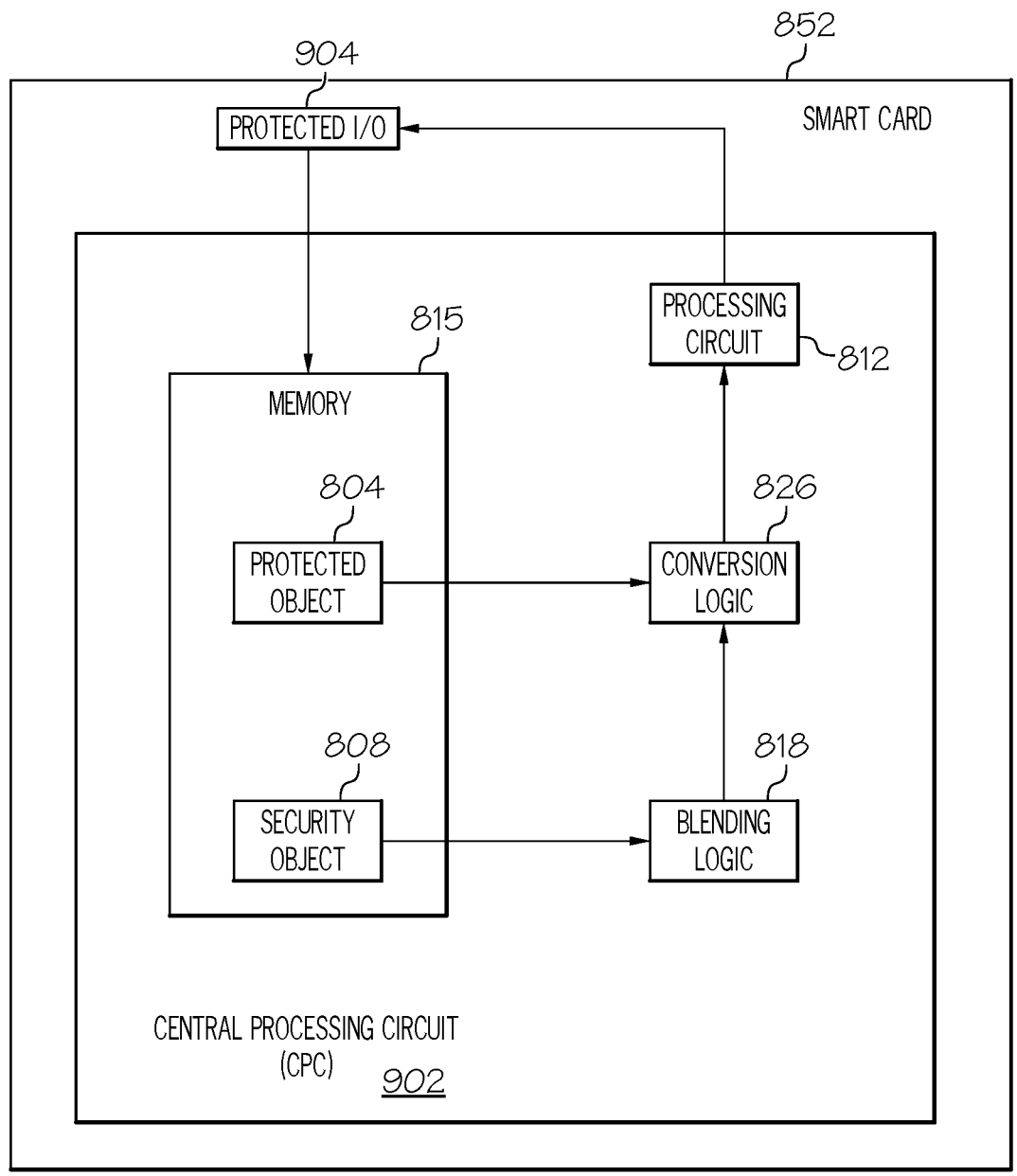
FIG. 9 depicts additional detail of an internal circuitry of one embodiment of the novel smart card depicted in FIG. 8.

In order to provide additional security to the system described herein, in one embodiment the memory 815, processing circuit 812, conversion logic 826, and blending logic 818 shown in FIG. 8 are part of a secure Central Processing Circuit (CPC) 902, as depicted in FIG. 9. As shown in FIG. 9, a protected I/O 904 controls what information can enter and leave the CPC 902. For example, protected object 804 and security object 808 can enter CPC 902, but cannot leave (i.e., they can be written to memory 815 by an outside source but cannot be read from memory 815 by an outside source). Likewise, the only output from processing circuit 812 coming directly from processing circuit 812 (i.e., via a hardwire or firewall), but not the protected object 804 and/or security object 808, can exit the smart card 852 via the protected I/O 904.

In one embodiment, the protected object 804 and/or security object 808 are further protected by being within a protected zone of memory 815. For example, security object 808 may contains a security algorithm/key/password, which is required by a memory manager (not shown) to allow a memory controller (also not shown) to access the protected zone of memory 815. Note that the projected object 804 and/or security object 808 may still be encrypted, even when stored in a protected zone of memory 815.

As described herein, in one embodiment of the present invention the smart card 852 is a transaction payment card (i.e., a credit card, debit card, etc.). In this embodiment, the smart card 852 may display (e.g., on the display 836 shown in FIG. 8) a matrix barcode that contains payment information for a user/holder of the smart card 852. In another embodiment, the smart card 852 generates a radio frequency signal, such as those used by a secure wireless communication (e.g., a near-field communication used with smart-card standard protocols), to generate payment information/authorization. In another embodiment, the smart card 852 functions as an identification (ID) card. In this embodiment, ID information for the holder/user of the smart card 852 is presented on the display (e.g., as a matrix barcode that contains identification information for a user), or as a radio frequency signal that supplies identity information/authorization. In another embodiment, the smart card 852 functions as a premises access card (i.e., a card that, when swiped, opens a locked door, notifies a security station, etc.). In this embodiment, the ID information is presented as a matrix barcode that contains access authorization information for the holder/user of the smart card 852 on the display, or as a radio frequency signal that supplies identity information/authorization.

Returning to FIG. 8, note that in one embodiment, a comparison logic 838 reads the biometric data 820 (which in one embodiment is prompted by activity analyzer 832, and in another embodiment occurs whenever an attempt to use the smart card 852 occurs) and compares the biometric data 820 with stored/trusted/known biomarker readings for the holder of the smart card 852. If there is not a match, then the blocking logic 840 prevents the processing circuit 812 from outputting a signal that enables the smart card 852 to perform a particular function. If there is a match, then the smart card 852 is allowed to function as desired by the user/holder.

In one embodiment of the present invention, the biosensor 822 is a camera, and the biomarker (e.g., biometric data 820) is a digital photograph of the person who is in physical possession of the smart card. In this embodiment, the smart card 852 further comprises a photo memory (e.g., part of or accessible to the comparison logic 838), where the photo memory holds a previous digital photograph of the person who is authorized to be in physical possession of the smart card, where the previous digital photograph was taken before the biomarker was taken. The comparison logic 838 compares the previous digital photograph and the biomarker. The blocking logic 840 thus prevents the conversion logic 826 from creating an executable application (e.g., unprotected object 828) in response to the previous digital photograph failing to match the biomarker/photo.

In one embodiment of the present invention, a planned activity for which the smart card 852 will be used is a planned financial transaction. In this embodiment the smart card 852 further comprises a physical positioning logic (e.g., a GPS system that is part of activity detector 830) that identifies a physical location of the smart card 852 in real-time. A financial transaction logic (i.e., evaluation logic 842) evaluates details of a proposed transaction (i.e., what is being purchased, the cost of the product, etc.). The financial transaction logic combines this information with other analyses provided by the activity analyzer 832 (i.e., where the purchase is taking place, etc.) to determine whether or not a predefined risk associated with the planned activity exceeds a predetermined value, particularly in response to the physical positioning logic within the activity detector 830 determining that the smart card 852 is at a physical location that has been predetermined to be incongruous with the planned financial transaction. If so, then the transaction will be blocked, either by sending a signal as such to a POS card swiper, or by disabling the output/function of the processing circuit 812.

In one embodiment of the present invention, the person who is in physical possession of the smart card is a particular worker, wherein the planned activity is an equipment maintenance operation. In this embodiment, the smart card 852 further comprises a worker evaluation logic (i.e., evaluation logic 842). This worker evaluation logic identifies an activity that has been preauthorized to be performed by the particular worker, such as adjusting critical components of a machine (e.g., issuing a command to a control panel to pull control rods in a nuclear reactor). An activity approval logic (also part of evaluation logic 842) determine whether or not this particular person is authorized to perform this particular operation. If not, then the activity approval logic blocks the smart card 852 from presenting requisite information (e.g., information in a matrix bar code) needed to perform this operation. In one embodiment, this blockage is accomplished by preventing conversion logic 826 from creating the hybrid security object (i.e., blended data 824) in response to the equipment maintenance/operation failing to match the activity that has been preauthorized to be performed by the particular worker. In another embodiment, the blockage is accomplished by simply disabling the processing circuit 812.

In one embodiment of the present invention, the receiving device 834 in FIG. 8 includes a rescission command logic (not shown). This rescission command logic, in response to the smart card 852 receiving a rescission command from the security object issuer 806, executes the rescission command to deactivate the security object 808. This deactivation of the security object 808 prevents future executions/conversions of the protected object 804, thus providing additional control over the functionality of the smart card 852.

In one embodiment of the present invention, the protected object 804 is stored in a protected region of memory 815 within the smart card 852. In this embodiment, the hybrid security object (i.e., blended data 824) provides access to this protected region of the memory 815 within the smart card 852. A memory access logic (not shown) then utilizes that hybrid security object to access the protected object within the protected region of the memory 815 within the smart card 852.

Figure 10:
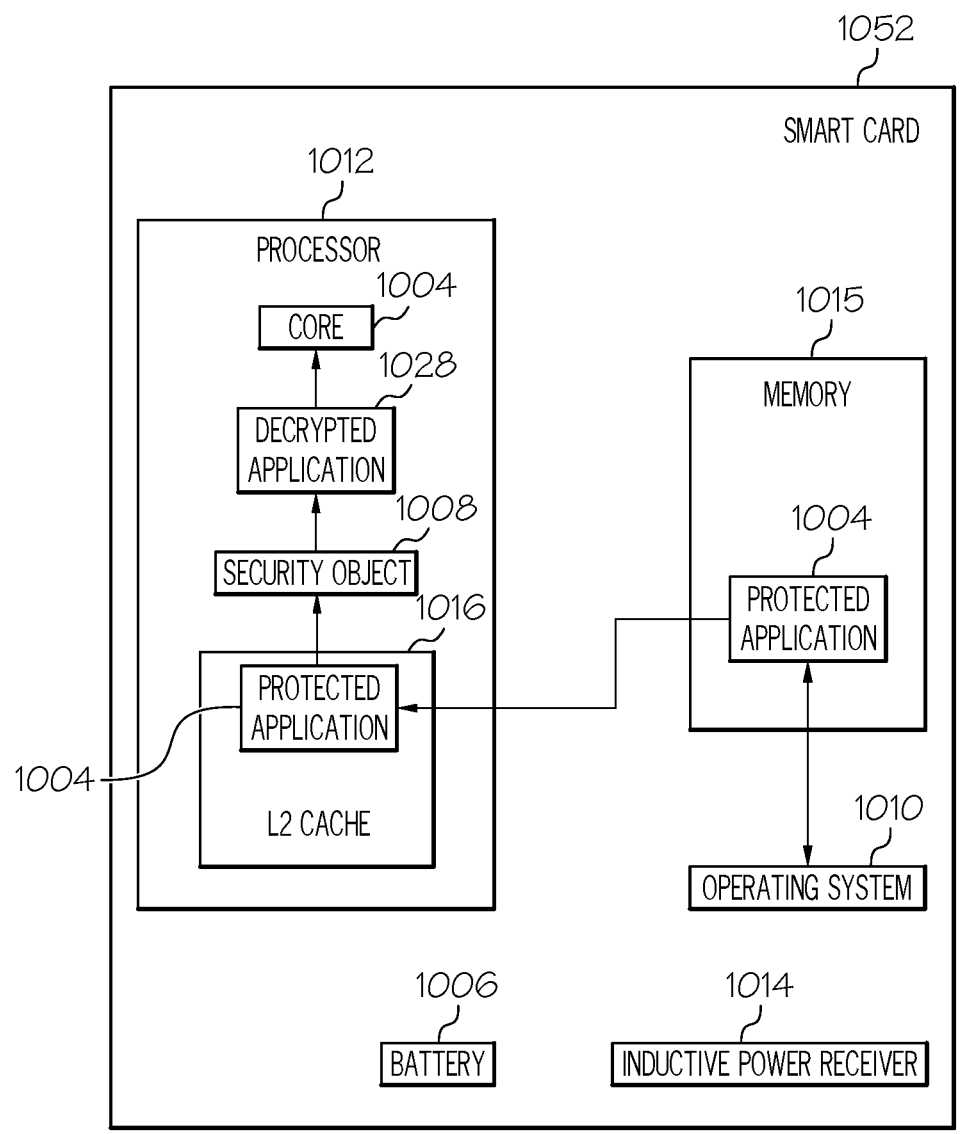
FIG. 10 depicts additional detail of a novel smart card that is capable of supporting an internal processor.

While the present invention has been presented above in embodiments in which the logic complexity of processing circuit 812 is rudimentary, in other embodiments processing circuit 812 has much more complexity, including that of a microprocessor. For example, consider the smart card 1052 (analogous to the smart card 852 shown in FIG. 8), as depicted in FIG. 10. As shown smart card 1052 has an internal processor 1012, which in one embodiment is powered by a battery 1006 and/or an inductive power receiver 1014 (i.e., a wireless charger, which receives near-field electromagnetism and converts it into direct current power). Assuming, therefore, that the smart card 1052 is capable of supporting processor 1012, then FIG. 10 depicts additional detail of one embodiment in which a security object 1008 (analogous to the security object 808 and/or blended data 824 shown in FIG. 8) is able to make a protected application 1004 (analogous to the protected object 804 shown in FIG. 8) executable. More specifically, in one embodiment the security object 1008 enables the processor 1012 to decrypt the protected application 1004 inside (and only inside) a processor 1012 in the smart card 1052, which provides an additional level of security to the smart card 1052. For example, assume that protected (e.g., "encrypted") application 1004 is moved in its encrypted form from memory 1015 within the smart card 1052 to an operational memory within the processor 1012, such as an L2 cache 1016 (e.g., L2 cache 616 shown in FIG. 6). When read into the L2 cache 1016, the protected application 1004 is encrypted, and thus is not executable. However, (still within the processor 1012) the protected application 1004 is sent to the security object 1008, which renders an executable decrypted application 1028 that can be executed by a core 1004 of the processor 1012.

Returning again to FIG. 8, in one embodiment of the present invention, the presence of the holder of the smart card 852 is confirmed by physical manipulation detection logic within the smart card 852. For example, assume that the holder of the smart card 852 is attempting to conduct a financial transaction (e.g., make a purchase) over the Internet. A vendor system 846 will request from a customer computer 848 (e.g., one of the other computer(s) shown in FIG. 1) the name of the person making the purchase, as well as the credit card account number. However, a nefarious computer can supply such information automatically (assuming that there has been successful unauthorized access of the account). In order to overcome this problem, the present invention utilizes the orientation logic 844 and/or the touch-screen capability of the display 836 shown in FIG. 8 to confirm that the buyer (holder of the smart card 852) is physically present at his computer. For example, the vendor system may direct, over the Internet, the holder of the smart card 852 to physically manipulate the smart card 852 in a certain way. If the user does so, then the display 836 will display a security code or other information that the vendor system 846 requires (and has a copy of for comparison) to complete the transaction, which the buyer will then enter from his customer computer 848. The physical manipulation of the smart card 852 may be to shake the smart card 852 a certain number of times, turn it over a certain number of times, hold it upside down for a certain length of time, press on the display 836 in a certain quadrant, etc., which will be detected by the orientation logic 844, display 836, and other physical sensors embedded in the smart card 852. All of these acts require a person to physically manipulate the smart card 852, thus ensuring that the account data is not simply being sent by a computer or person who has stolen the information from the smart card 852, but rather is being sent from a person who is currently in possession of the smart card 852 itself.

In a further embodiment of the present invention, the requisite physical manipulation of the smart card 852 is known only to the authorized holder of the smart card 852. For example, when setting up the smart card 852, the vendor system 846 receives from the customer computer 848 an input indicating that the "secret manipulation" that the authorized holder will perform is to touch the upper right quadrant of the display 836 (or the smart card 852 itself, assuming that there is a touch grid across the smart card 852) while holding the smart card 852 upside down. When the vendor system 846 wants to complete a purchase transaction with the customer computer 848, rather than telling the card holder how to physically manipulate the smart card 848, the vendor system 846 will simply direct the card holder to handle the smart card 852 according to that user's "secret manipulation" protocol (e.g., holding the card upside down while touching the right upper quadrant of the display/card). This "secret manipulation" is known to only the authorized holder of the smart card 852, thus providing an additional level of security to the smart card 852. Note further that protocol/steps for this "secret manipulation", which is created by the authorized holder, provides additional accessibility, since the "secret manipulation" involves only actions that the authorized holder is physically able to perform.

In one embodiment, rather than the card holder telling the vendor system 846 in words how the "secret manipulation" will be performed during setup, the authorized card holder will perform the "secret manipulation" for the first time during the setup of the card. The orientation logic 844 and/or display 836 and/or touch detection grid (not depicted) across the smart card 852 will detect the physical manipulations to the smart card 852 that are associated with this "secret manipulation", and then send signals to the customer computer 848 and/or the vendor system 846 (e.g., via a near field communication network transceiver—not shown), for storage therein, that are generated by these setup physical manipulations of the smart card 852.

Figure 11:
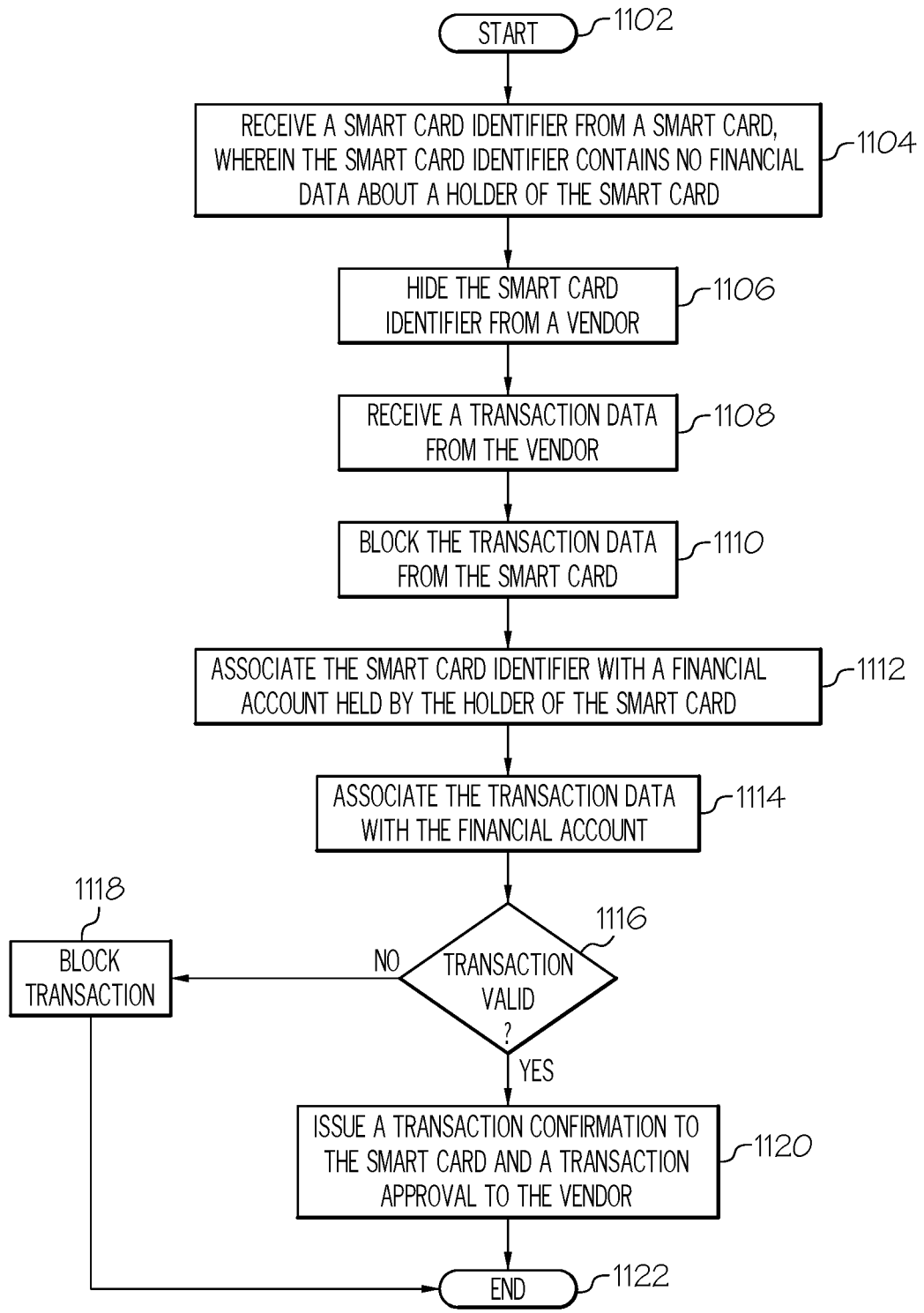
FIG. 11 is a high-level flow chart of exemplary steps taken to securely manage transactions made with a smart/virtual card.

With reference now to FIG. 11, a high-level flow chart of exemplary steps taken by one or more processors to securely manage a smart card is presented. After initiator block 1102, a processing entity receives a smart card identifier from a smart card (block 1104). As described herein, the smart card identifier is a transaction-specific identifier for a transaction, and contains no financial data about a holder of the smart card who is a first party to the transaction. As described in block 1106, the smart card identifier is hidden from a second party to the transaction, such as a vendor.

As described in block 1108, the processing entity receives transaction data for the transaction from the second party (e.g., vendor), and the transaction data is blocked/hidden from the smart card (block 1110). As described in block 1112, the processing entity associates the smart card identifier with account data for an account assigned to the holder of the smart card. As described herein, the "account data" may be financial account data (e.g., bank records, credit card information, etc.), or it may be a database of other data related to the smart card holder's authorization to perform certain tasks, enter certain areas, etc.

As described in block 1114, the processing entity associates the transaction data with the account to determine if the transaction is valid according to information located in the account data (query block 1116). If not, then the transaction is blocked (block 1118), and the process ends (terminator block 1122). However, if the transaction is valid (query block 1116), then the processing entity issues a transaction confirmation to the smart card and a transaction approval to the second party to the transaction (block 1120), and the flowchart ends (terminator block 1122).

As described herein, in one embodiment the smart card is implemented as a virtual card on a mobile computing device. In this embodiment, a mobile device (e.g., portable computing device) receives a protected application, where the received protected application, in its present state, cannot be utilized by an operating system for execution by a processor (i.e., it is encrypted, is stored within a currently inaccessible protected zone in memory, etc.). The mobile device further receives a security object, which is used to convert the received protected application into an executable application that can be utilized by the operating system for execution by the processor (e.g., by decryption, enablement of access to protected memory, etc.). A processor within the mobile device then uses the security object to create, through the use of a protected application, the virtual card, which is a software-based object that provides the functionality of a predefined physical electronic card. For example, the virtual card may generate a matrix barcode, which is displayed on the screen of the mobile device. This matrix barcode is then readable by a scanner to provide the same functionality of a credit/debit/gift card, identification card, building access card, toll road access card, retail store "reward" card, etc.

In one embodiment of the present invention, the virtual smart card is rescindable. Thus, if a rescission command has been received by the mobile device and/or a third party management system, then this rescission command causes the previously received security object, and/or the public key used to encrypt the security object, to be deactivated. In one embodiment, this deactivation is performed by erasing (i.e., "blanking") the received security object and/or the protected application from all memory in the mobile device. The protected security object that is erased may be that non-executable application and/or the executable application. In another embodiment, this deactivation is performed by executing new code that blocks a processor within the mobile device from accepting instructions from the enabled protected application. As further described herein, executing the rescission command simply erases the security object, public key used to decrypt the security object, the protected or unprotected application, and/or the virtual card from the mobile device. In another embodiment, some or all of these elements (the security object, public key used to decrypt the security object, the protected or unprotected application) remain stored on the mobile device, but are disabled by additional code that prevents their execution/operation.

In one embodiment of the present invention the mobile device comprises a processor, the processor comprises a core, and the core comprises an instruction cache. In one embodiment, the executable application comprises multiple processor-executable operands (i.e., multiple lines of executable instructions). In this embodiment, and as described in further detail in FIG. 4, the method further comprises moving a processor-executable operand from the executable application directly into an instruction cache in the core while bypassing an instruction fetch address register (IFAR) in the core. That is, rather than sending executable operands through predecode logic 602, IFAR 630, etc. in FIG. 6, the security object is able to push executable operands directly onto the L1 I-cache 618, thus providing faster, and yet still secure, operations within the core. Note that L1 denotes lowest level of cache, which is first checked to locate an operand (in the case of an instruction (I) cache) or data (in the case of a data (D) cache). If the requisite operand/data is not found within the L1 cache (i.e., a "cache miss"), then the next highest level cache memory (L2 cache)

is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

In one embodiment of the present invention, the physical electronic card being emulated by the virtual card on the mobile device is a payment card. In this embodiment, the method further comprises generating a matrix barcode that contains payment information for a user of the mobile device, and then displaying the matrix barcode on a display on the mobile device. In another embodiment, the emulated payment card generates a radio frequency signal, such as those used by a secure wireless communication (e.g., a near-field communication used with smart-card standard protocols), to generate payment information/authorization.

In one embodiment of the present invention, the physical electronic card being emulated by the virtual card on the mobile device is an identification (ID) card. In the embodiment, the method further comprises generating a matrix barcode that contains identification information for a user of the mobile device, and then displaying the matrix barcode on a display on the mobile device. In another embodiment, the emulated identification card generates a radio frequency signal, such as those used by a secure wireless communication (e.g., a near-field communication used with smart-card standard protocols), to generate identity information/authorization.

In one embodiment of the present invention, the physical electronic card being emulated by the virtual card on the mobile device is a premises access card (i.e., a card that, when swiped, opens a locked door, notifies a security station, etc.). In this embodiment, the method further comprises generating a matrix barcode that contains access authorization information for a user of the mobile device, and then displaying the matrix barcode on a display on the mobile device. In another embodiment, the emulated access card generates a radio frequency signal, such as those used by a secure wireless communication (e.g., a near-field communication used with smart-card standard protocols), to generate premises access information/authorization.

As described herein, in one embodiment of the present invention the smart card is a standalone physical card. In this embodiment, the method further comprises storing, in a memory in the smart card, a protected object, which initially cannot be utilized in its protected state by the processing circuit within the smart card. An activity detector receives a signal that describes a planned activity of a person who is in physical possession of the smart card. An activity analyzer analyzes features of the planned activity, and determines whether or not a predefined risk associated with the planned activity exceeds a predetermined value. If not, then the protected object is simply decrypted or otherwise converted (e.g., with a standard private decryption key) for execution/use. However, if the risk level exceeds a predefined acceptable level, then the activity analyzer: issues an instruction to the person who is in physical possession of the smart card to provide a biomarker to a biosensor on the smart card; and receives, from the biosensor, real-time biometric data (i.e., a biomarker) for the person who is in physical possession of the smart card. A receiving device in the smart card then receives a security object, which is combined, by a blending logic, with the real-time biometric data (biomarker) to generate a hybrid security object. A conversion logic, using the hybrid security object, converts the received protected object into a usable object (e.g., executable application, signal controller, etc.) that can be utilized by the processing circuit within the smart card to provide a specific functionality to the smart card.

In one embodiment of the present invention, the biosensor is a camera, and the biomarker is a digital photograph of the person who is in physical possession of the smart card. In this embodiment, the method further comprises storing, in a photo memory, a previous digital photograph of the person who is in physical possession of the smart card, where the previous digital photograph was taken before the biomarker was taken. A comparison logic compares the previous digital photograph and the biomarker. A blocking logic the blocks the conversion logic from creating the usable object in response to the previous digital photograph failing to match the biomarker.

In one embodiment of the present invention, the planned activity with which the smart card will be used is a planned financial transaction. In this embodiment, the method further comprises identifying, by a physical positioning hardware device, a physical location of the smart card in real-time. A financial transaction logic and the activity analyzer are then able to determine that the predefined risk associated with the planned activity exceeds the predetermined value in response to the physical positioning logic determining that the smart card is at a physical location that has been predetermined to be incongruous with the planned financial transaction.

In one embodiment of the present invention, the person who is in physical possession of the smart card is a particular worker, the planned activity is an equipment operation, and the method further comprises identifying, by a worker evaluation logic, an activity that has been preauthorized to be performed by the particular worker. An activity approval logic blocks the conversion logic from creating the hybrid security object in response to the equipment operation failing to match the activity that has been preauthorized to be performed by the particular worker.

In one embodiment of the present invention, the method further comprises executing, in response to the smart card receiving a rescission command, a rescission command to deactivate the security object, wherein deactivating the security object prevents future executions of the protected object.

In one embodiment of the present invention, the protected object is stored in a protected region of memory within the smart card, and the hybrid security object provides access to the protected region of the memory within the smart card. In this embodiment, the method further comprises utilizing, by a memory access hardware logic, the hybrid security object to access the protected object within the protected region of the memory within the mobile device.

In one embodiment of the present invention, the smart card functions as a payment card. In this embodiment, the method further comprises generating, by a matrix barcode generator, a matrix barcode that contains payment information for the person who is in physical possession of the smart card, and displaying, on a display on the smart card, the matrix barcode.

In one embodiment of the present invention, the smart card functions as an identification card. In this embodiment, the method further comprises generating, by a matrix barcode generator, a matrix barcode that contains identification information for the person who is in physical possession of the smart card, and displaying, on a display on the smart card, the matrix barcode.

In one embodiment of the present invention, the smart card functions as a premises access card. In this embodiment, the method further comprises generating, by a matrix barcode generator, a matrix barcode that contains access authorization information for the person who is in physical possession of the smart card, and displaying, on a display on the smart card, the matrix barcode.

As will be appreciated by one skilled in the art, aspects of the present invention may be embodied as a system, method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
receiving, by a processing entity, a smart card identifier from a smart card, wherein the smart card is a virtual card on a mobile computing device that comprises a processor, wherein the processor comprises a core, wherein the core comprises an L1 instruction cache, wherein the smart card identifier is a transaction-specific identifier for a transaction, and wherein the virtual card provides a functionality of the smart card;
receiving a protected application at the mobile computing device, wherein a received protected application initially cannot be utilized by an operating system for execution by the processor;
receiving a security object at the mobile computing device, wherein the security object is used to convert the received protected application into an executable application that can be utilized by the operating system for execution by the processor, wherein the executable application comprises multiple processor-executable operands;
executing the executable application by the processor to operate as a card; and
moving a processor-executable operand from the executable application directly into the L1 instruction cache in the core by bypassing an instruction fetch address register (IFAR) in the core.

2. The method of claim 1, further comprising:
receiving a rescission command at the mobile computing device; and
executing the rescission command to deactivate the security object, wherein deactivating the security object prevents future executions of the received protected application.

3. The method of claim 1, wherein the received protected application is encrypted, wherein the security object is a processor-executable decryption object, and wherein the method further comprises:
decrypting the received protected application with the security object.

4. The method of claim 1, wherein the received protected application is stored in a protected region of memory within the mobile computing device, wherein the security object provides access to the protected region of the memory within the mobile computing device, and wherein the method further comprises:
utilizing the security object to access the received protected application within the protected region of the memory within the mobile computing device.

5. The method of claim 1, wherein the predefined physical electronic card is an identification card, wherein the mobile computing device comprises a display, and wherein the method further comprises:
generating a matrix barcode that contains identification information for a user of the mobile computing device; and
displaying the matrix barcode on the display on the mobile computing device.

6. The method of claim 1, wherein the predefined physical electronic card is a premises access card, wherein the mobile computing device comprises a display, and wherein the method further comprises:
generating a matrix barcode that contains access authorization information for a user of the mobile computing device; and
displaying the matrix barcode on the display on the mobile computing device.

7. A computer program product for managing smart card transactions, the computer program product comprising a computer readable storage medium having program code embodied therewith, the program code readable and executable by one or more processors to perform a method comprising:
receiving a smart card identifier from a smart card, wherein the smart card is a virtual card on a mobile computing device that comprises a processor, wherein the processor comprises a core, wherein the core comprises an L1 instruction cache, wherein the smart card identifier is a transaction-specific identifier for a transaction, and wherein the virtual card provides a functionality of the smart card;
receiving a protected application at the mobile computing device, wherein a received protected application initially cannot be utilized by an operating system for execution by the processor;
receiving a security object at the mobile computing device, wherein the security object is used to convert the received protected application into an executable application that can be utilized by the operating system for execution by the processor, wherein the executable application comprises multiple processor-executable operands;

executing the executable application by the processor to operate as a card; and moving a processor-executable operand from the executable application directly into the L1 instruction cache in the core by bypassing an instruction fetch address register (IFAR) in the core.

8. The computer program product of claim 7, wherein the method further comprises:

receiving a rescission command at the mobile computing device; and executing the rescission command to deactivate the security object, wherein deactivating the security object prevents future executions of the received protected application.

9. The computer program product of claim 7, wherein the received protected application is encrypted, wherein the security object is a processor-executable decryption object, and wherein the method further comprises:

decrypting the received protected application with the security object.

10. The computer program product of claim 7, wherein the received protected application is stored in a protected region of memory within the mobile computing device, wherein the security object provides access to the protected region of the memory within the mobile computing device, and wherein the method further comprises:

utilizing the security object to access the received protected application within the protected region of the memory within the mobile computing device.

11. The computer program product of claim 7, wherein the predefined physical electronic card is an identification card, wherein the mobile computing device comprises a display, and wherein the method further comprises:

generating a matrix barcode that contains identification information for a user of the mobile computing device; and displaying the matrix barcode on the display on the mobile computing device.

12. The computer program product of claim 7, wherein the predefined physical electronic card is a premises access card, wherein the mobile computing device comprises a display, and wherein the method further comprises:

generating a matrix barcode that contains access authorization information for a user of the mobile computing device; and displaying the matrix barcode on the display on the mobile computing device.

13. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving a smart card identifier from a smart card, wherein the smart card is a virtual card on a mobile computing device that comprises a processor, wherein the processor comprises a core, wherein the core comprises an L1 instruction cache, wherein the smart card identifier is a transaction-specific identifier for a transaction, and wherein the virtual card provides a functionality of the smart card;

receiving a protected application at the mobile computing device, wherein a received protected application initially cannot be utilized by an operating system for execution by the processor;

receiving a security object at the mobile computing device, wherein the security object is used to convert the received protected application into an executable application that can be utilized by the operating system for execution by the processor, wherein the executable application comprises multiple processor-executable operands;

executing the executable application by the processor to operate as a card; and moving a processor-executable operand from the executable application directly into the L1 instruction cache in the core by bypassing an instruction fetch address register (IFAR) in the core.

14. The computer system of claim 13, wherein the method further comprises:

receiving a rescission command at the mobile computing device; and executing the rescission command to deactivate the security object, wherein deactivating the security object prevents future executions of the received protected application.

15. The computer system of claim 13, wherein the received protected application is encrypted, wherein the security object is a processor-executable decryption object, and wherein the method further comprises:

decrypting the received protected application with the security object.

16. The computer system of claim 13, wherein the predefined physical electronic card is an identification card, wherein the mobile computing device comprises a display, and wherein the method further comprises:

generating a matrix barcode that contains identification information for a user of the mobile computing device; and displaying the matrix barcode on the display on the mobile computing device.

17. The computer system of claim 13, wherein the predefined physical electronic card is a premises access card, wherein the mobile computing device comprises a display, and wherein the method further comprises:

generating a matrix barcode that contains access authorization information for a user of the mobile computing device; and displaying the matrix barcode on the display on the mobile computing device.

* * * * *